(12) United States Patent
Sugiyama

(10) Patent No.: US 8,373,784 B2
(45) Date of Patent: Feb. 12, 2013

(54) SOLID-STATE IMAGING DEVICE, DRIVING METHOD THEREOF, AND IMAGING APPARATUS

(75) Inventor: Toshinobu Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 258 days.

(21) Appl. No.: 12/765,265

(22) Filed: Apr. 22, 2010

(65) Prior Publication Data

US 2010/0277631 A1 Nov. 4, 2010

(30) Foreign Application Priority Data

Apr. 30, 2009 (JP) .............................. P2009-110750
Jan. 25, 2010 (JP) .............................. P2010-012927

(51) Int. Cl.
*H04N 3/14* (2006.01)
*H04N 5/335* (2011.01)
(52) U.S. Cl. ....................................................... 348/297
(58) Field of Classification Search ................... 348/297
See application file for complete search history.

(56) References Cited

U.S. PATENT DOCUMENTS

| | | | | |
|---|---|---|---|---|
| 5,438,365 A | * | 8/1995 | Yamashita et al. | 348/297 |
| 6,219,097 B1 | * | 4/2001 | Kamishima et al. | 348/297 |
| 7,554,588 B2 | * | 6/2009 | Yaffe | 348/297 |
| 7,884,868 B2 | * | 2/2011 | Kurane | 348/297 |
| 2005/0151866 A1 | * | 7/2005 | Ando et al. | 348/297 |
| 2006/0266923 A1 | * | 11/2006 | Mabuchi | 250/208.1 |
| 2007/0296843 A1 | * | 12/2007 | Kasuga et al. | 348/294 |
| 2008/0055440 A1 | * | 3/2008 | Pertsel et al. | 348/297 |

FOREIGN PATENT DOCUMENTS

JP 2008 99158 4/2008

* cited by examiner

*Primary Examiner* — Sinh Tran
*Assistant Examiner* — Christopher K Peterson
(74) *Attorney, Agent, or Firm* — Frommer Lawrence & Haug LLP; William S. Frommer

(57) ABSTRACT

A solid-state imaging device includes: a pixel array unit in which unit pixels are two-dimensionally disposed; a vertical scanning unit selecting the unit pixels, which read out the signal electric charges, for each line; signal processing units separately disposed for each column of the pixel array unit and generate pixel signals corresponding to the signal electric charges; a horizontal scanning unit reading out the pixel signal by sequentially selecting the signal processing unit and outputting image signals in the unit of one line; and a scanning control unit performing operations of the vertical scanning unit and the horizontal scanning unit, wherein the scanning control unit selects a line having an exposure period different from that of a selected line between lines selected in the scanning order and sequentially outputs an image signal of an image having the different exposure period in the unit of one line from the horizontal scanning unit.

14 Claims, 27 Drawing Sheets

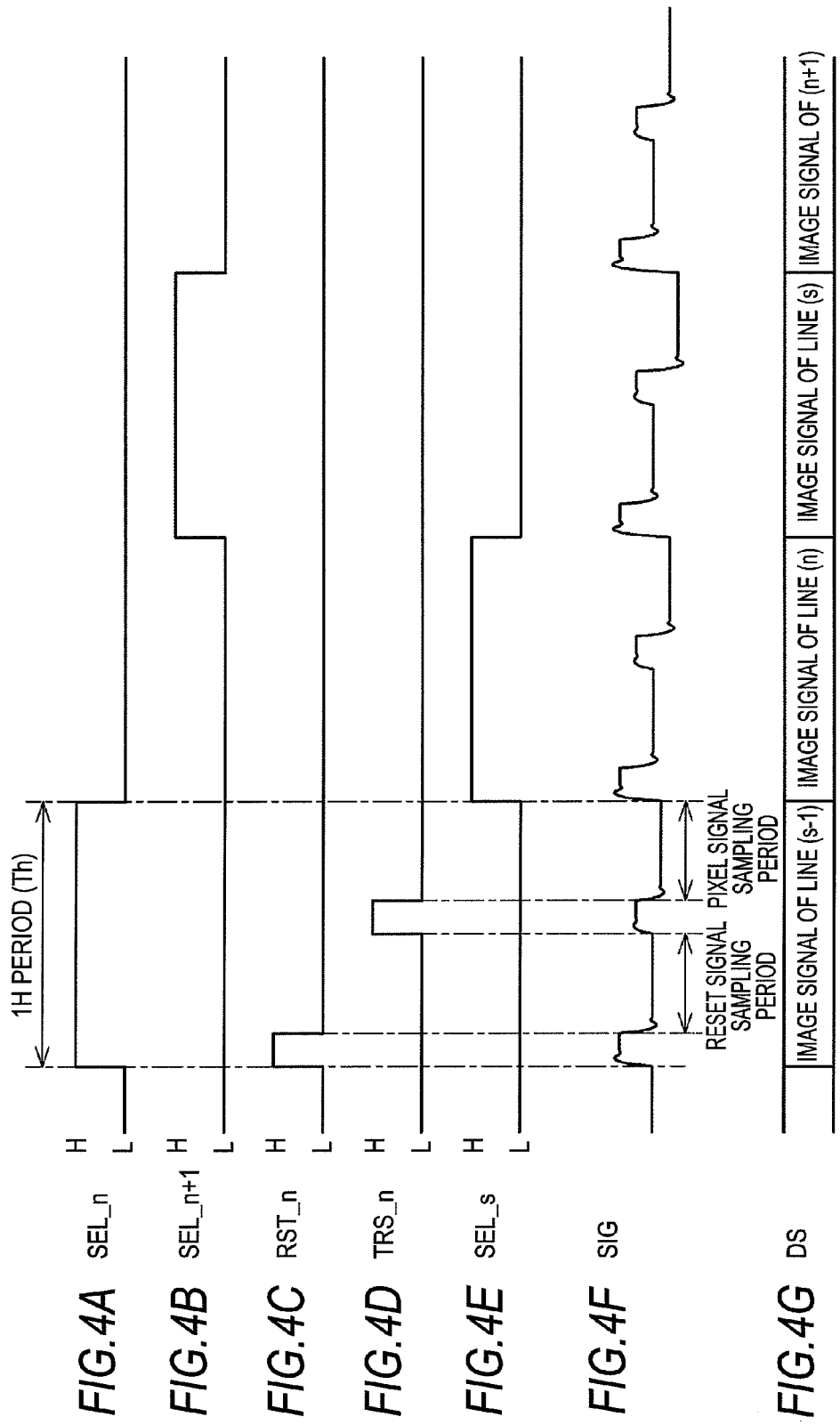

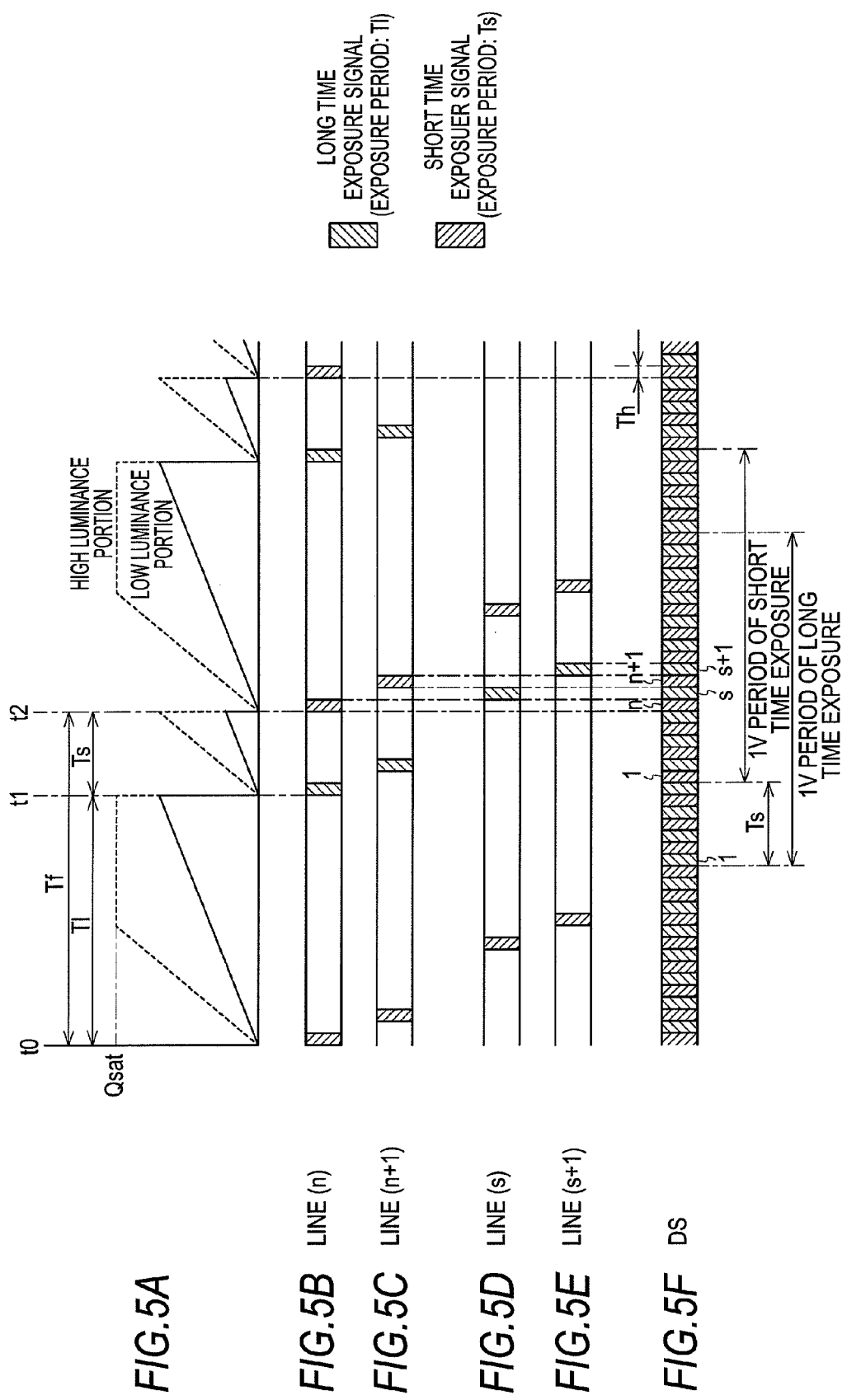

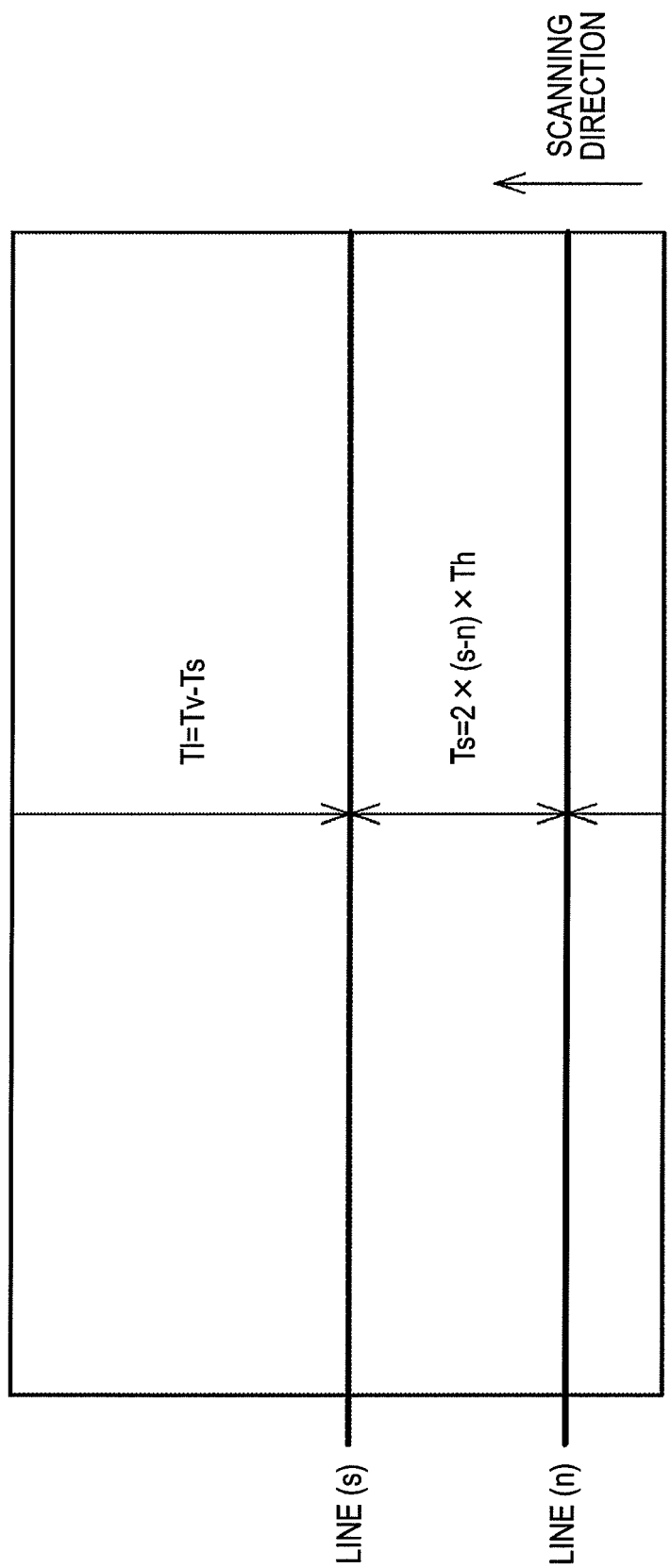

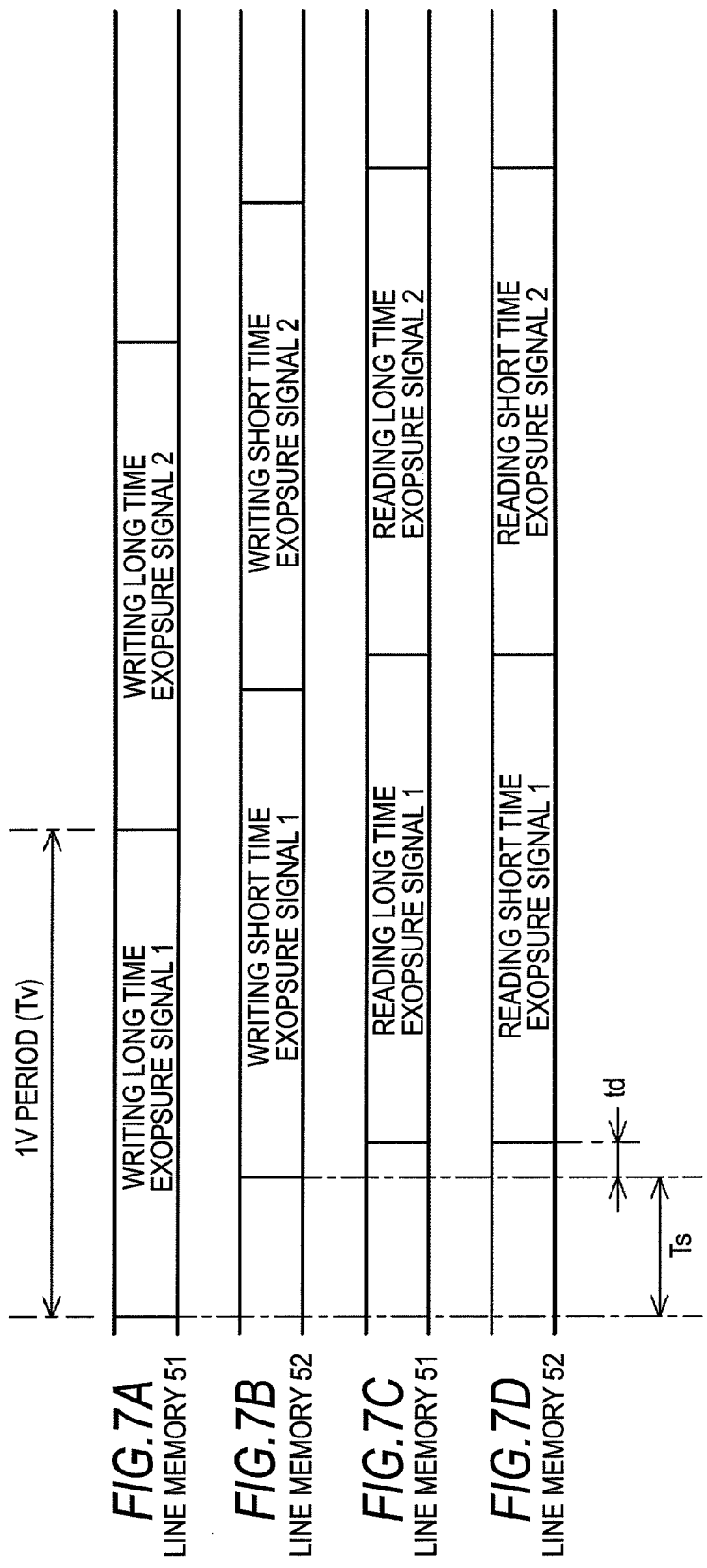

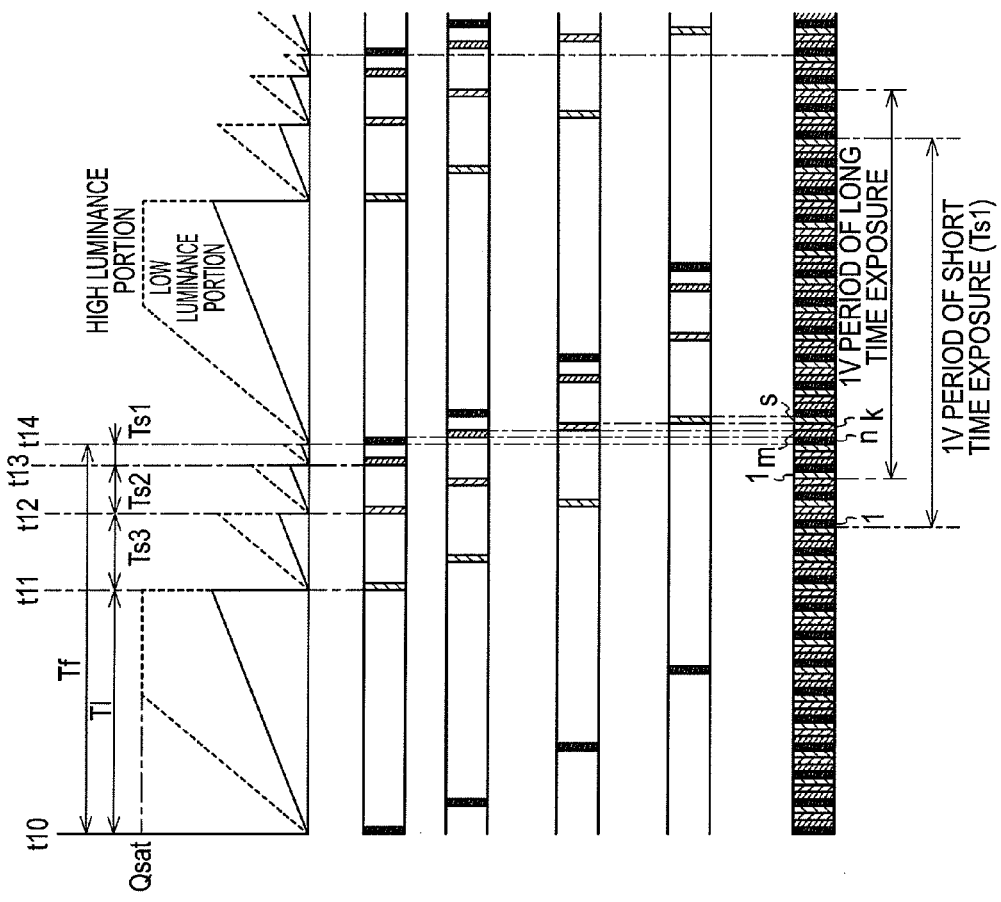

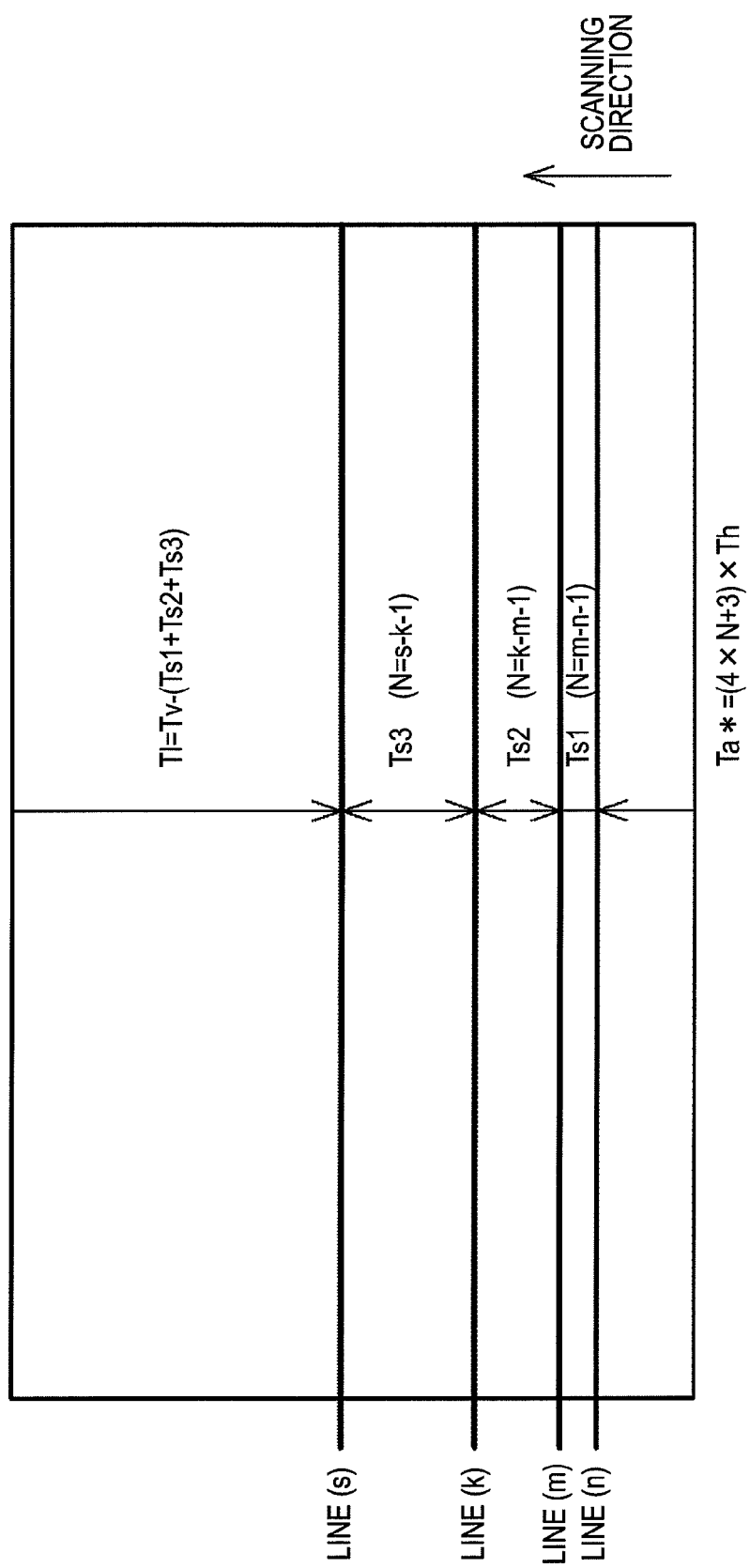

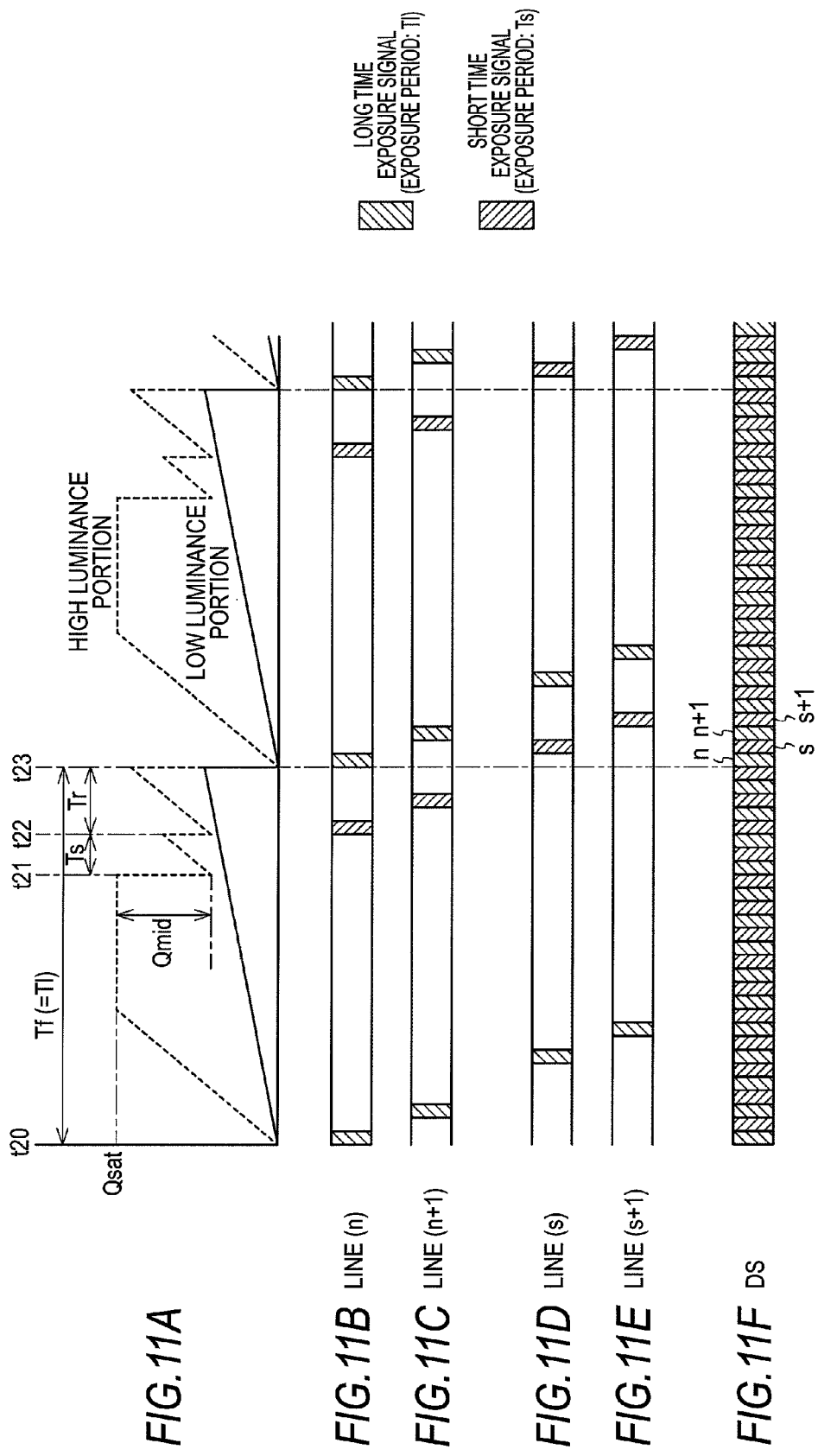

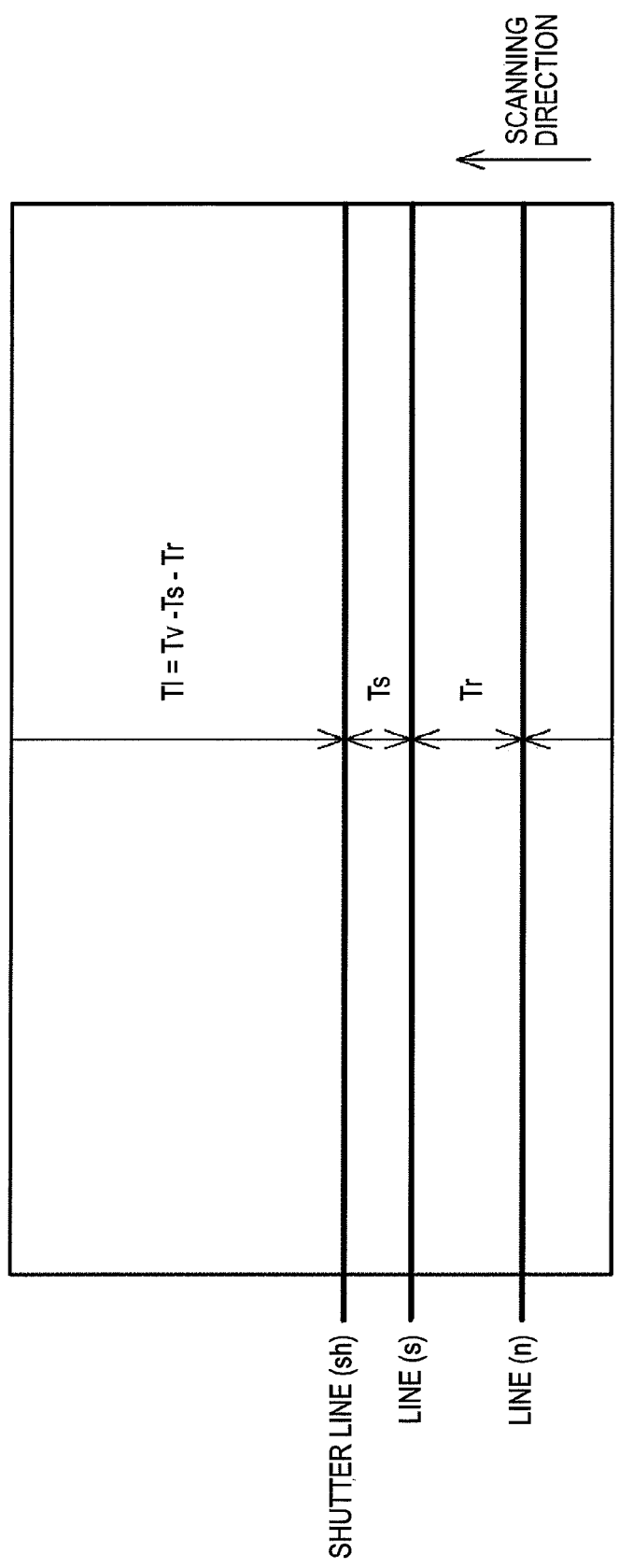

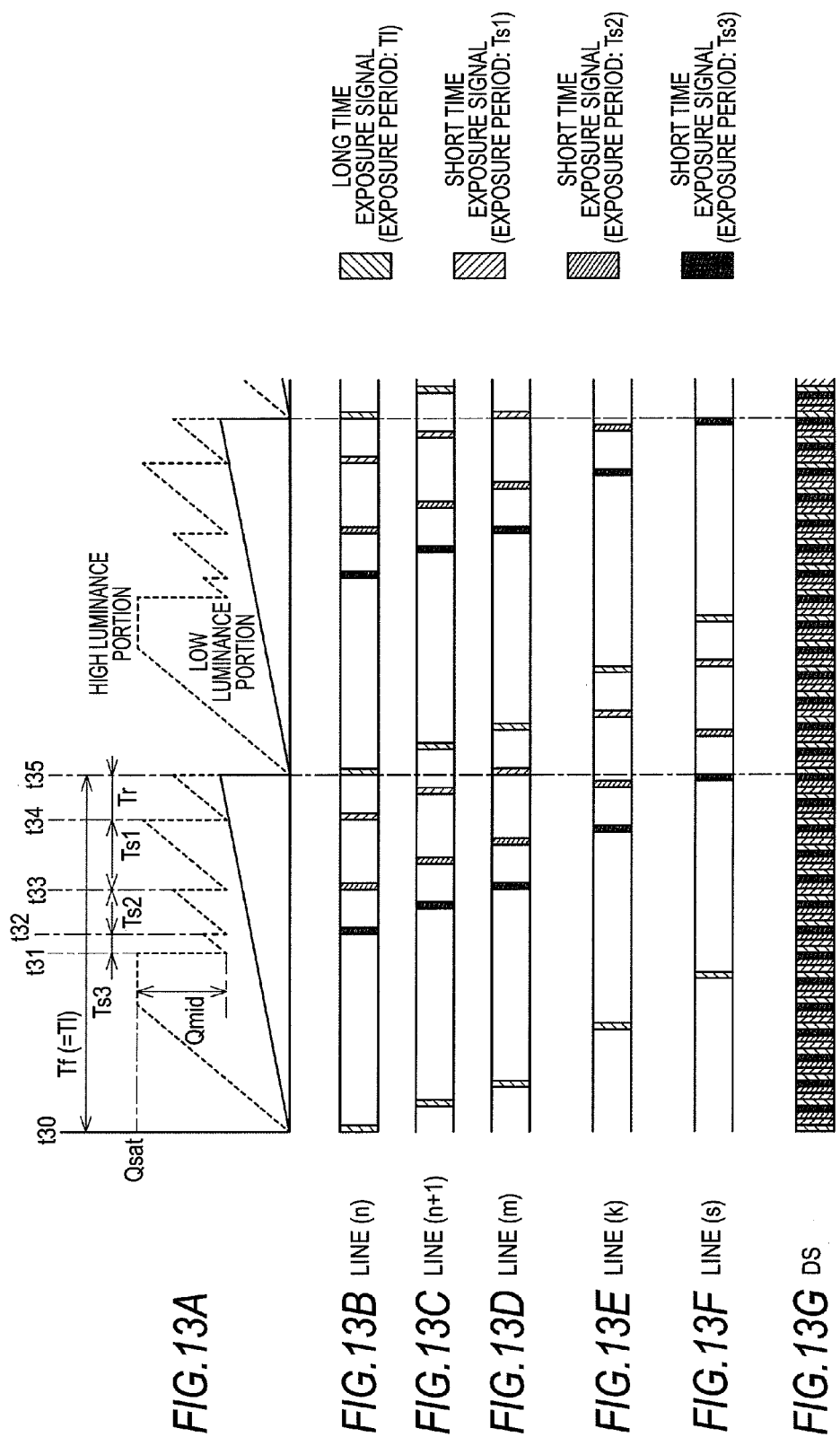

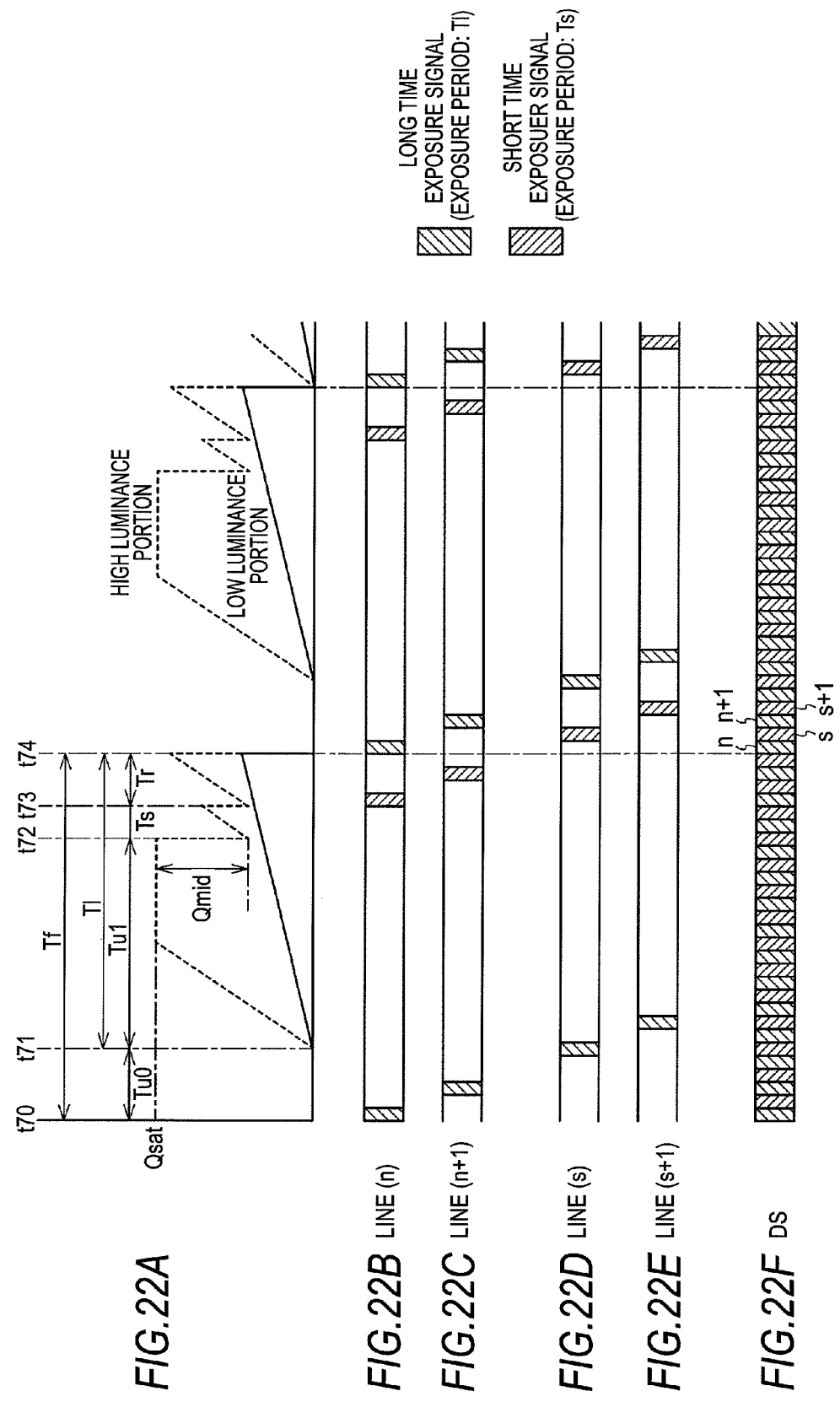

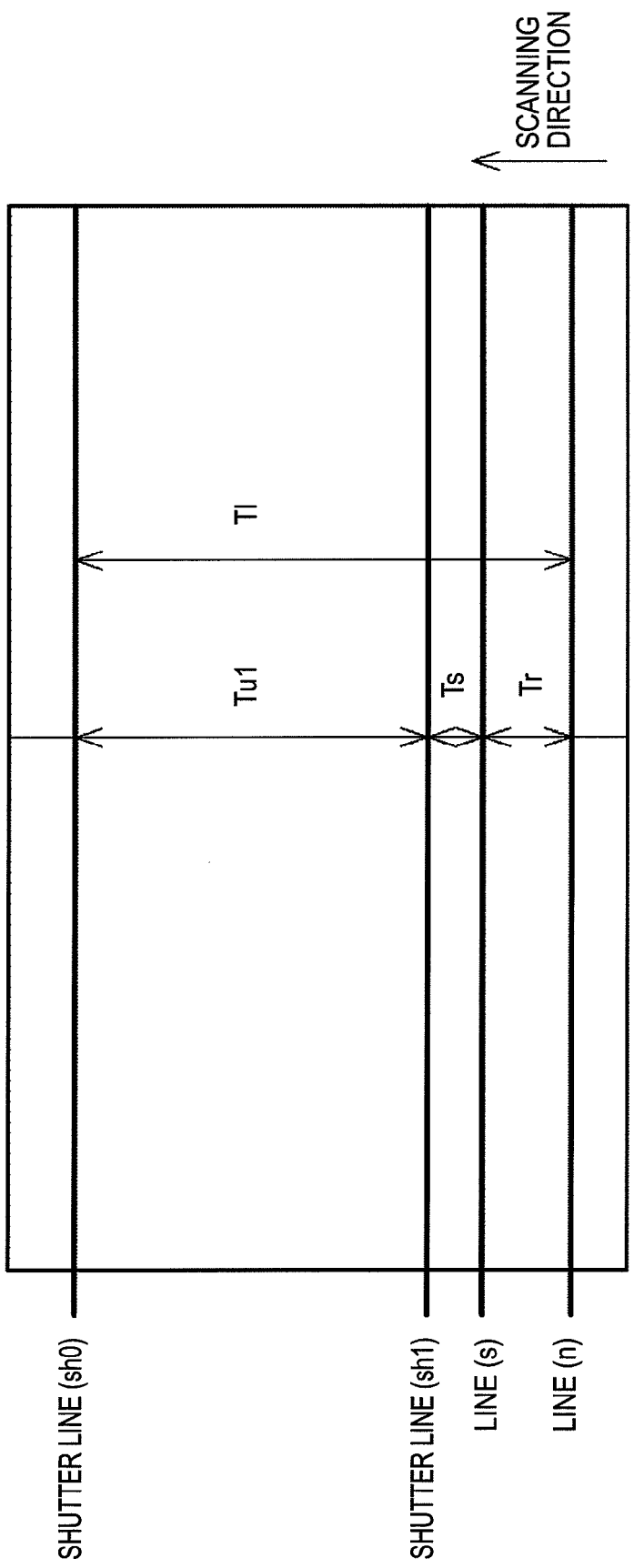

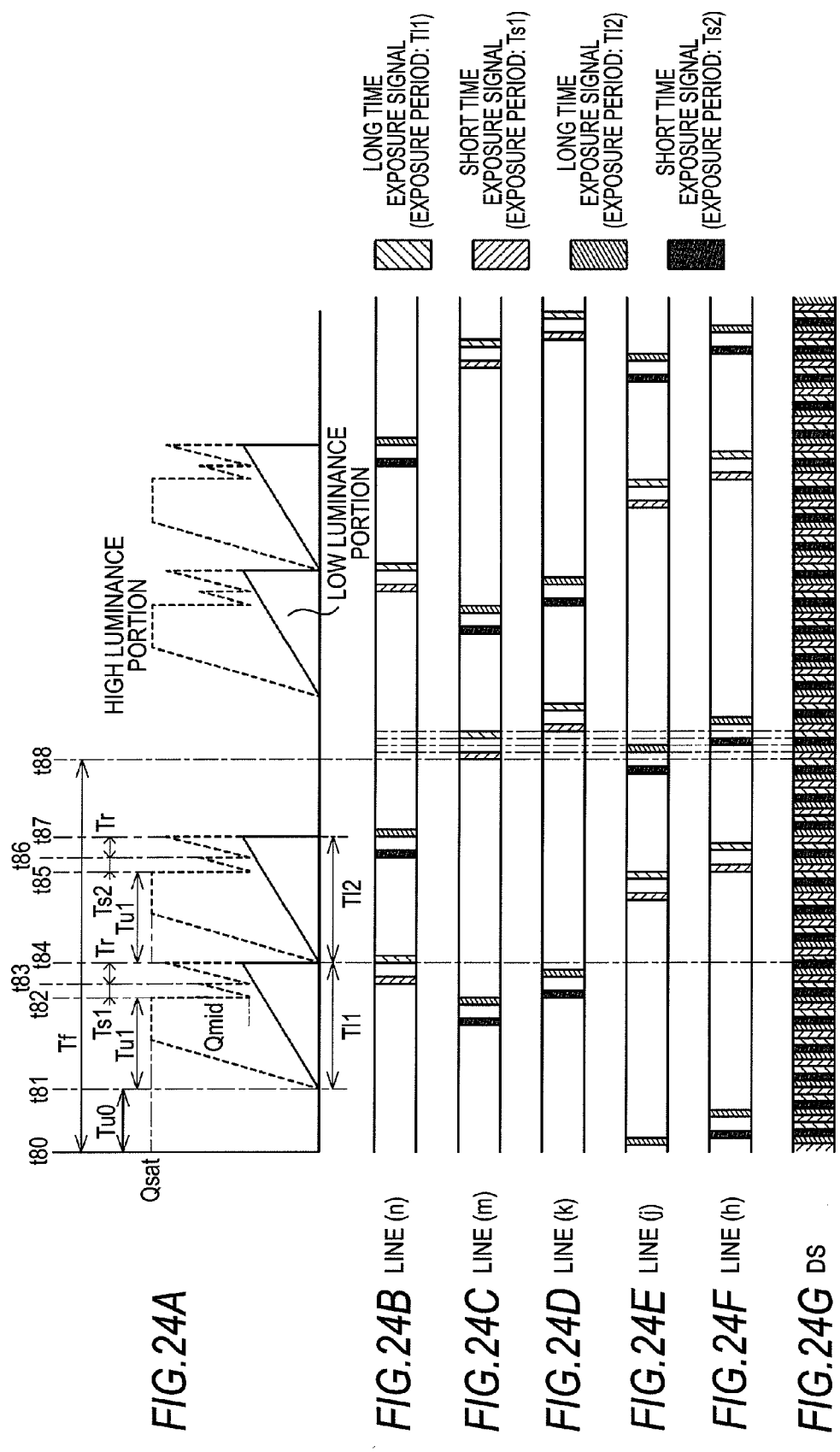

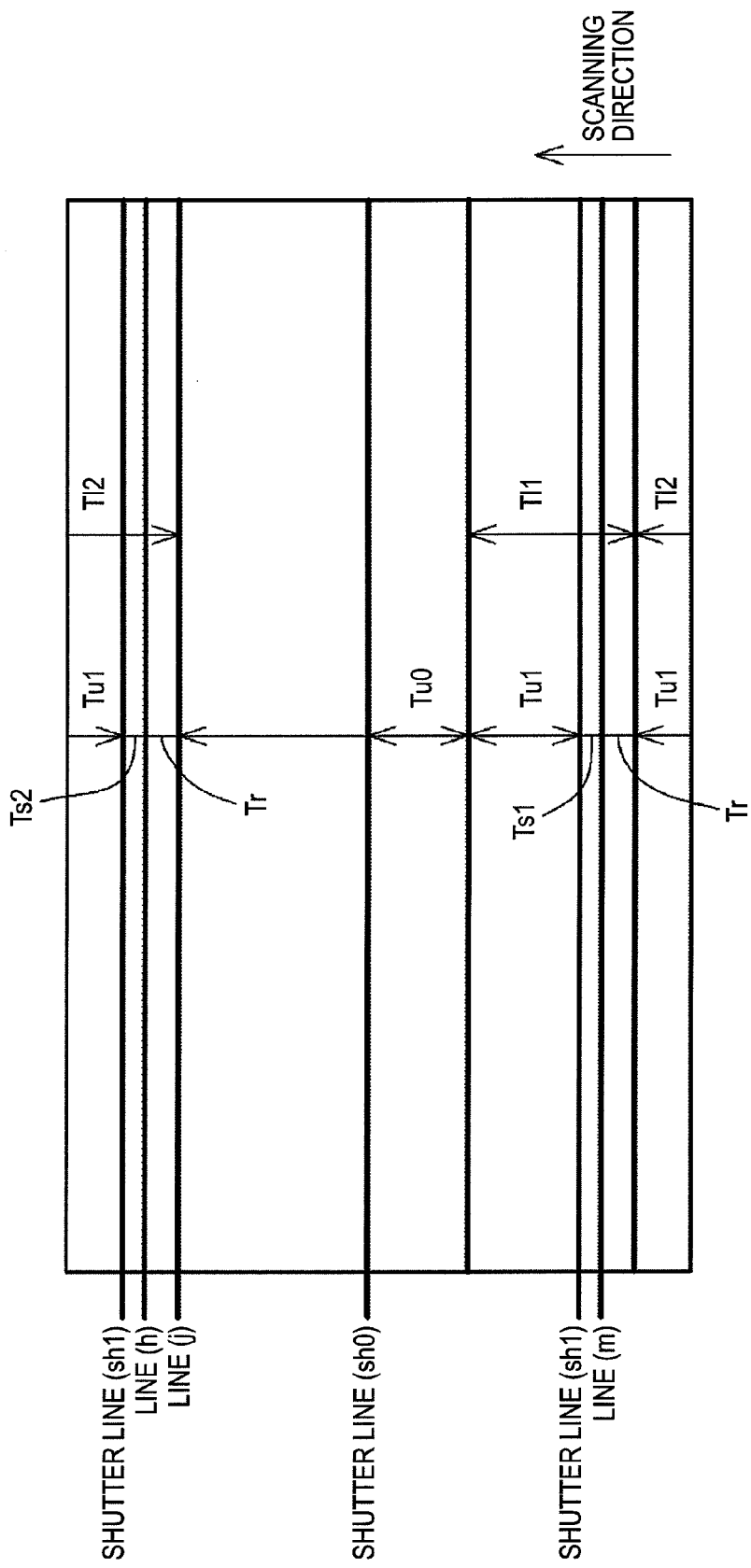

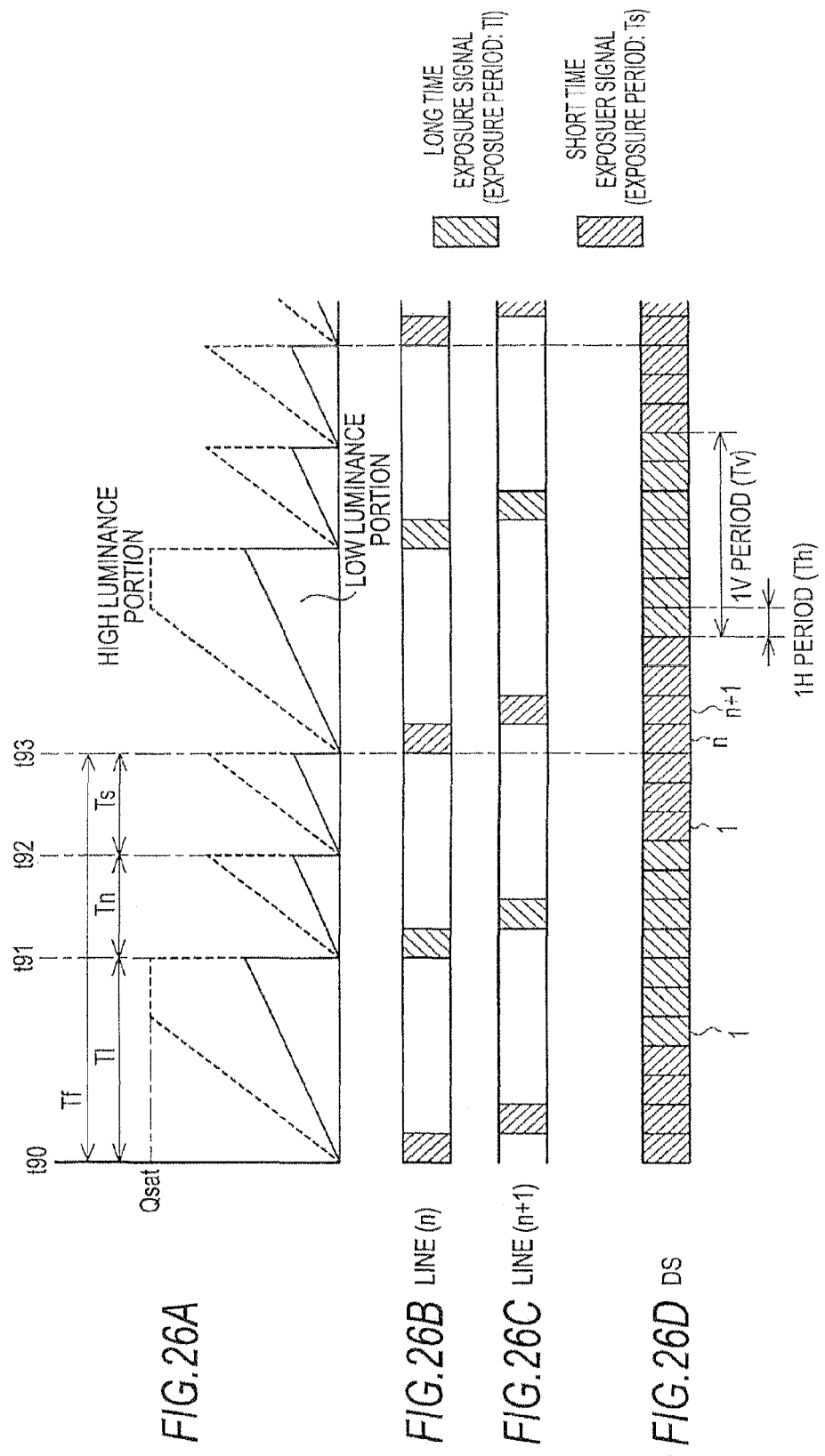

SOLID-STATE IMAGING DEVICE, DRIVING METHOD THEREOF, AND IMAGING APPARATUS

BACKGROUND OF THE INVENTION

1. Field of the Invention

The present invention relates to a solid-state imaging device, a driving method thereof, and an imaging apparatus, and more particularly, to a solid-state imaging device, a driving method thereof, and an imaging apparatus capable of suppressing generation of a false color or an afterimage at a time when a dynamic range is extended by using image signals of a plurality of exposure periods.

2. Description of the Related Art

Generally, for imaging apparatuses used for monitoring and the like, the characteristic of a wide dynamic range capable of displaying an image from a dark portion to a bright portion without any collapse in imaging a backlight scene, simultaneous indoor and outdoor imaging, or the like is demanded. In order to achieve the characteristic of the wide dynamic range, within a predetermined frame period divided into groups for long time exposure and for short time exposure, read-out of electric charges accumulated during different exposure periods is performed.

FIGS. 26A to 26D represent an operation of related art. In the operation of related art, a long time exposure period and a short time exposure period are arranged for a solid-state imaging device such as a CMOS image sensor, and after image read-out during one exposure period is completed, image read-out during the other exposure period is performed.

FIG. 26A shows a temporal change in signal electric charges accumulated in a photo diode of a pixel of line (n). In addition, FIG. 26B shows the operation of the pixel of the line (n). FIG. 26C shows the operation of a pixel of line (n+1), and FIG. 26D shows an image signal DS. According to a two-time exposure method in which long time exposure and short time exposure are performed, the pixels are swept twice in one video frame period Tf, and thereby two image signals including a signal generated by the long time exposure and a signal generated by the short time exposure are read out. For example, when a long time exposure period Tl is set to a half of the one video frame period Tf, signal electric charges accumulated from time point t90 are read out at time point t91. In addition, at time point when a period acquired by subtracting the long time exposure period Tl and a short time exposure period Ts from the one video frame period Tf elapses, a so-called shutter operation is performed.

In other words, at time point t92 when a period Tn (Tn=Tf−Tl−Ts) elapses from the time point t91, the shutter operation is performed for the accumulated signal electric charges through a reset operation. Thereafter, at time point t93 when the short time exposure period Ts elapses from the time point t92, the accumulated signal electric charges are read out. Such a line read-out operation is sequentially performed from the pixel of the first line. Accordingly, as shown in FIGS. 26B and 26C, a signal of line (n+1) is read out after the read-out of the signal of the line (n). Therefore, as the output of the solid-state imaging device, as shown in FIG. 26D, data of the long time exposure corresponding to one screen and data of the short time exposure corresponding to one screen are alternately output during a period that is a half of the one video frame period Tf.

FIGS. 27A and 27B shows a line from which signal electric charges are read out in the operation of related art. When the read out of the signal electric charges is sequentially performed from the pixel of the first line, at the time point t91, as shown in FIG. 27A, the signal electric charges accumulated by the long time exposure are read out from the pixel of the line (n). In addition, at the time point t93, as shown in FIG. 27B, the signal electric charges accumulated by the short time exposure are read out from the pixel of the line (n). In addition, when the shutter operation is performed in the pixel of line (s), as shown in FIG. 27B, the line (s) is in a position in which the sweeping time is earlier than that of the line (n) by the short time exposure period Ts. In other words, the pixel of the line (s) that performs the shutter operation is set so as to satisfy the condition of "Ts=(s−n)×Th". Here, "Th" is one horizontal period.

In addition, according to the technology disclosed in JP-2008-99158, in a case where the long time exposure and the short time exposure are performed within a frame period, in resetting the signal electric charges for accumulation of signal electric charges according to the short time exposure, an intermediate voltage is set so as to perform ejection of a part of the signal electric charges. As described above, a part of the signal electric charges is ejected by setting the intermediate voltage. Accordingly, even when the signal electric charges are reset for the short time exposure for a portion of a subject having low luminance, an image signal having a long exposure period is generated without ejecting the accumulated electric charges.

SUMMARY OF THE INVENTION

However, when the long time exposure period and the short time exposure period are arranged, and image read-out during one exposure period is performed after image read-out during the other exposure period is completed, simultaneousness of the same subject in the images of the long time exposure and the short time exposure disappears due to a time difference between the image read-outs.

For example, as shown in FIGS. 26A to 26D, a time difference of (period Tn+short time exposure period Ts) occurs between a long time exposure image and a short time exposure image. Thus, when there is a subject moving within the time difference, the simultaneousness of the long time exposure image and the short time exposure image disappears. There is a problem in that a phenomenon called a false color occurs in the subject in a case where the long time exposure image and the short time exposure image are composed together. In other words, in a case where different signals are selected in selecting a long time exposure signal and a short time exposure signal for pixels of red, green, and blue that are differentiated by color filters disposed in the solid-state imaging device, the simultaneousness among color signals disappears, thereby a color component ratio is deviated from that of the actual subject.

Accordingly, when a demosaicing process is performed in camera signal processing, a color that does not originally exist is generated. Such a false color becomes a factor causing severe deterioration of the developed image quality in the edge of a subject in a case where there is a great difference between the luminance levels of the background and the subject.

In addition, in a case where the setting of the exposure period is set to be performed three times or more, the setting of the short time exposure period is performed twice or more. Accordingly, when a subject moving at a high speed is photographed, a result that is the same as that acquired by pressing the shutter twice is acquired. Therefore, there is a problem in that the contour of the subject as an afterimage (ghost) remains in a case where the images are composed together.

Thus, there is a need for providing a solid-state imaging device, a driving method thereof, and an imaging apparatus capable of easily generating an image, in which generation of a false color or an afterimage is suppressed, having a wide dynamic range by using a simple configuration.

According to an embodiment of the present invention, there is provided a solid-state imaging device including: a pixel array unit in which unit pixels each including a photoelectric conversion device converting an optical signal into signal electric charges are two-dimensionally disposed in a matrix shape; a vertical scanning unit that selects the unit pixels, which read out the signal electric charges, for each line; signal processing units that are separately disposed for each column of the pixel array unit and generate pixel signals corresponding to the signal electric charges read out from the unit pixel; a horizontal scanning unit that reads out the pixel signal by sequentially selecting the signal processing unit and outputs image signals in the unit of one line; and a scanning control unit that performs operations of the vertical scanning unit and the horizontal scanning unit. The scanning control unit, in selection of a line for a vertical scanning direction, selects a line having an exposure period different from an exposure period of a selected line between lines selected in the scanning order and sequentially outputs an image signal of an image having the different exposure period in the unit of one line from the horizontal scanning unit.

In the embodiment of the present invention, in the pixel array unit in which unit pixels each including a photoelectric conversion device converting an optical signal into signal electric charges are two-dimensionally disposed in a matrix shape, the unit pixels, which read out the signal electric charges, are selected for each line, and pixel signals corresponding to the signal electric charges read out from each unit pixel are generated by signal processing units that are separately disposed for each column of the pixel array unit. In addition, the pixel signals generated by the signal processing units are output as an image signal in the unit of one line. Here, in selection of a line for the vertical scanning direction, a line located in a position far away from the position of the scanning order in accordance with another exposure period is selected between lines selected in the scanning order, and an operation of reading out the signal electric charges of the selected line is performed as a reset operation for stating exposure of an exposure period different from the exposure period of the read-out signal electric charges. Then, an image signal of an image having the different exposure period is sequentially output in the unit of one line from the horizontal scanning unit. In addition, in setting the exposure periods, an operation of resetting a part of the signal electric charges performed by applying an intermediate voltage to the unit pixel is set to be performed at least once or more. Then first read-out of signal electric charges for reading out the signal electric charges accumulated after resetting of the signal electric charges and second read-out of signal electric charges for reading out the signal electric charges accumulated after resetting of a part of the signal electric charges by applying an intermediate voltage are performed in a combined manner. Thus, by performing the first read-out of signal electric charges after the second read-out of signal electric charges, an image signal of an image having the different exposure time is output. In addition, in setting the exposure periods, the exposure periods are adjusted in accordance with the brightness of the subject. For example, an exposure period having the longest exposure period out of a plurality of exposure periods is shortened when the subject is bright.

According to another embodiment of the present invention, there is provided a method of driving a solid-state imaging device including: a pixel array unit in which unit pixels each including a photoelectric conversion device converting an optical signal into signal electric charges are two-dimensionally disposed in a matrix shape; a vertical scanning unit that selects the unit pixels, which read out the signal electric charges, for each line; signal processing units that are separately disposed for each column of the pixel array unit and generate pixel signals corresponding to the signal electric charges read out from the unit pixel; a horizontal scanning unit that reads out the pixel signal by sequentially selecting the signal processing unit and outputs image signals in the unit of one line; and a scanning control unit that performs operations of the vertical scanning unit and the horizontal scanning unit. The method includes the step of allowing the scanning control unit to select a line having an exposure period different from an exposure period of a selected line between lines selected in the scanning order, in selection of the line in a vertical scanning direction and sequentially output an image signal of an image having the different exposure period in the unit of one line from the horizontal scanning unit by using the scanning control unit.

According to still another embodiment of the present invention, there is provided an imaging apparatus including: a pixel array unit in which unit pixels each including a photoelectric conversion device converting an optical signal into signal electric charges are two-dimensionally disposed in a matrix shape; a vertical scanning unit that selects the unit pixels, which read out the signal electric charges, for each line; signal processing units that are separately disposed for each column of the pixel array unit and generate pixel signals corresponding to the signal electric charges read out from the unit pixel; a horizontal scanning unit that reads out the pixel signal by sequentially selecting the signal processing unit and outputs image signals in the unit of one line; a scanning control unit that performs operations of the vertical scanning unit and the horizontal scanning unit; an image signal adjusting unit that adjusts timings of the image signals output from the horizontal scanning unit; and a signal composing unit that extends a dynamic range by composing a plurality of the image signals output from the image signal adjusting unit. The scanning control unit, in selection of a line for a vertical scanning direction, selects a line having an exposure period different from an exposure period of a selected line between lines selected in the scanning order and sequentially outputs an image signal of an image having the different exposure period in the unit of one line from the horizontal scanning unit, and the image signal adjusting unit divides the image signals output from the horizontal scanning unit for each of the exposure periods and outputs the image signals for each of the exposure periods with timings thereof coinciding with one another.

According to the above-described embodiments of the present invention, image signals of images having different exposure periods are sequentially output in the unit of one line from the horizontal scanning units. The image signal adjusting unit, for example, by controlling writing image signals into a memory and reading out the written image signal, outputs the image signals output from the horizontal scanning unit to the signal composition unit as image signals for each exposure period with the timings thereof coinciding with each other. In addition, when a plurality of exposure periods are repeatedly set to be continuous within the frame period by the scanning control unit, one image signal is calculated from a plurality of image signals within the frame period for each exposure period by the image signal adjusting unit, and the image signals calculated for each exposure period are output to the signal composition unit with the timings thereof coinciding with one another.

According to the embodiments of the present invention, in the pixel array unit in which unit pixels each including a photoelectric conversion device converting an optical signal into signal electric charges are two-dimensionally disposed in a matrix shape, the unit pixels, which read out the signal electric charges, are selected for each line, and pixel signals corresponding to the signal electric charges read out from each unit pixel are generated by the signal processing units that are separately disposed for each column of the pixel array unit. In addition, the pixel signals generated by the signal processing units are output as an image signal in the unit of one line. In addition, in selection of a line for a vertical scanning direction, a line having an exposure period different from an exposure period of a selected line is selected between lines selected in the scanning order, and an image signal of an image having the different exposure period is sequentially output in the unit of one line from the horizontal scanning unit.

Accordingly, for example, when a long time exposure period and a short time exposure period are arranged, image read-out of the other exposure period can be performed before image read-out of one exposure period is completed. Therefore, a time difference between the long time exposure image and the short time exposure image can be decreased. As a result, an image signal, in which generation of a false color or an afterimage is suppressed, having a wide dynamic range can be easily generated by using a simple configuration.

BRIEF DESCRIPTION OF THE DRAWINGS

FIGS. 4A to 4G are diagrams representing timings of each signal line for reading out pixel signals.

FIGS. 5A to 5F are diagrams illustrating the operation of a first embodiment.

FIG. 6 is a diagram showing line positions at time point t2.

FIGS. 7A to 7D are diagrams illustrating the operation of processing an image signal.

FIGS. 9A to 9F are diagrams illustrating the operation of a second embodiment.

FIG. 10 is a diagram showing line positions at time point t14.

FIGS. 11A to 11F are diagrams illustrating the operation of a third embodiment.

FIG. 12 is a diagram showing line positions at time point t23.

FIGS. 13A to 13G are diagrams illustrating the operation of a fourth embodiment.

FIGS. 22A to 22F are diagrams illustrating the operation of an eighth embodiment.

FIG. 23 is a diagram showing line positions at time point t74.

FIGS. 24A to 24G are diagrams illustrating the operation of a ninth embodiment.

FIG. 25 is a diagram showing line positions at time point t88.

FIGS. 26A to 26D are diagrams illustrating the operation of related art.

DESCRIPTION OF THE PREFERRED EMBODIMENTS

Hereinafter, embodiments of the present invention will be described. The description will be made in the following order.

Figure 1:
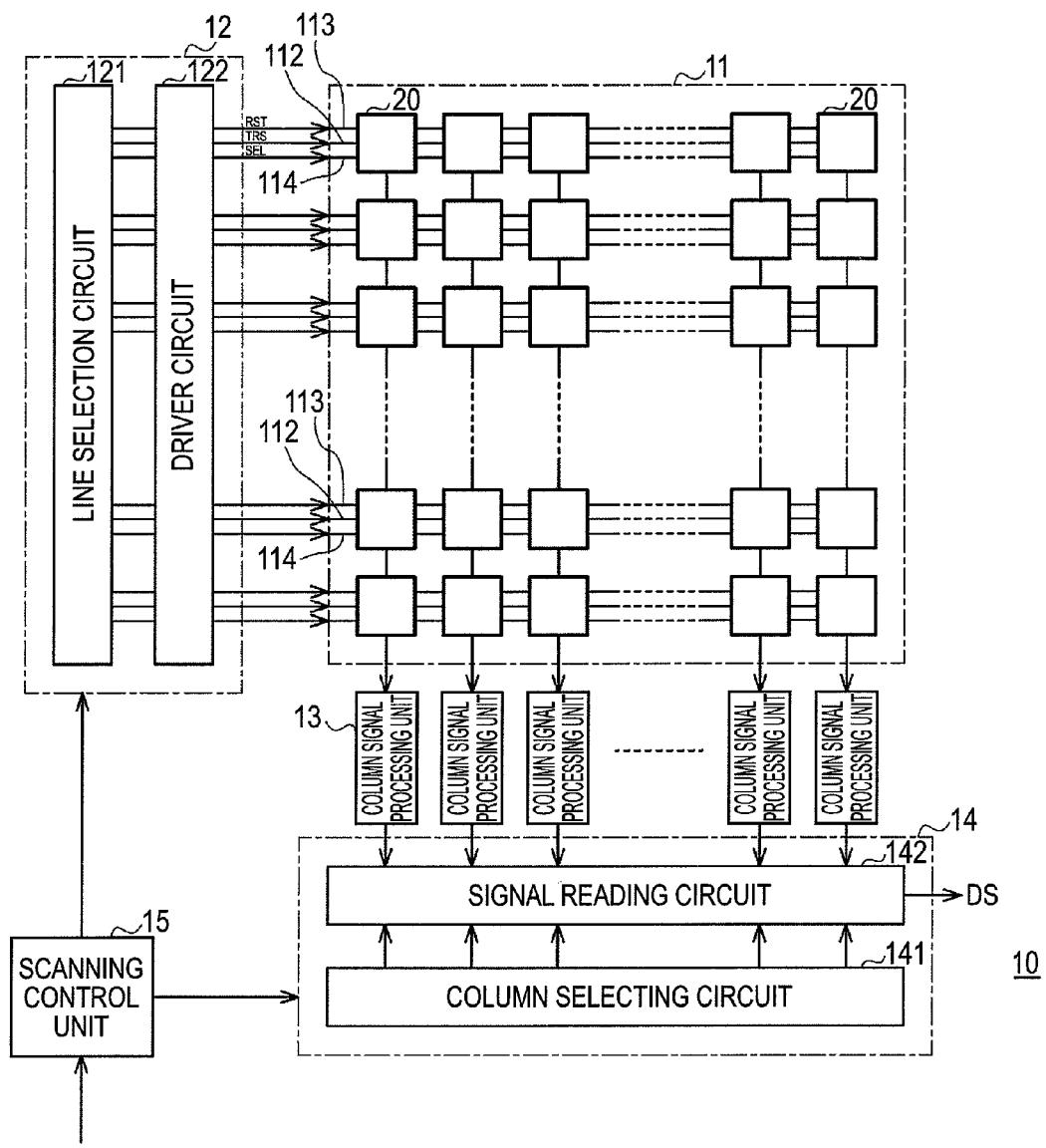
FIG. 1 is a diagram showing a configuration example of a solid-state imaging device.

1. First Embodiment
2. Second Embodiment
3. Third Embodiment
4. Fourth Embodiment
5. Fifth Embodiment
6. Sixth Embodiment
7. Seventh Embodiment
8. Eighth Embodiment
9. Ninth Embodiment
10. Tenth Embodiment 1. First Embodiment
Configuration of Solid-State Imaging Device FIG. 1 is a diagram showing a configuration example of a solid-state imaging device according to an embodiment of the present invention, for example, a CMOS image sensor. The solid-state imaging device 10 has a pixel array unit 11 in which unit pixels (hereinafter, also referred to as "pixels") 20 each including a photoelectric conversion device are two-dimensionally disposed in a matrix shape. In addition, the solid-state imaging device 10, for example, is configured to have a vertical scanning unit 12, a column signal processing unit 13, a horizontal scanning unit 14, and a scanning control unit 15 as peripheral circuits of the pixel array unit 11.

In the pixel array unit 11, the unit pixels 20 are two-dimensionally disposed in a matrix shape. In the unit pixel 20, a vertical signal line 111 is disposed for each column, and driving control lines such as a transmission control line 112, a reset control line 113, and a selection control line 114 are wired for each line.

Figure 2:
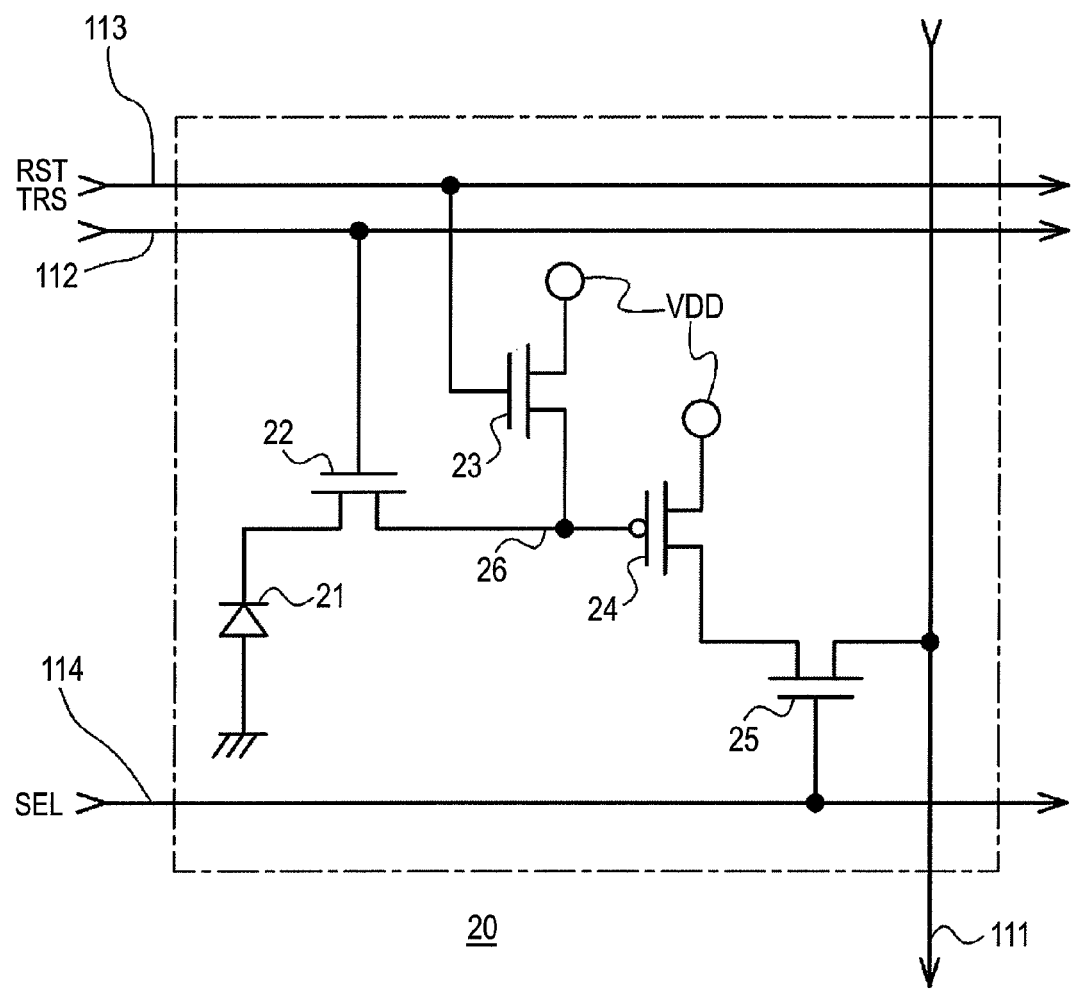
FIG. 2 is a diagram representing an example of the circuit configuration of a unit pixel.

FIG. 2 represents an example of the circuit configuration of the unit pixel 20. In addition to the photoelectric conversion device such as a photo diode 21, the unit pixel 20 has a pixel configuration having four transistors, for example, of a transmission transistor 22, a reset transistor 23, an amplifier transistor 24, and a selection transistor 25.

The transmission transistor 22 is connected between the cathode electrode of the photo diode 21 and an FD (floating diffusion) portion 26 that is a charge-voltage conversion unit. In addition, the gate electrode of the transmission transistor 22 is connected to the transmission control line 112. The transmission transistor 22 transmits signal electric charges, that are accumulated in accordance with photoelectric conversion performed by using the photo diode 21, to the FD portion 26 by applying a transmission pulse TRS to the gate electrode (control electrode) thereof.

The reset transistor 23 has the drain electrode connected to a pixel power source VDD and the source electrode connected to the FD portion 26. In addition, the gate electrode of the reset transistor 23 is connected to the reset control line 113. The reset transistor 23 resets the electric potential of the FD portion 26 to a predetermined electric potential by applying a reset pulse RST to the gate electrode thereof before transmission of signal electric charges from the photo diode 21 to the FD portion 26.

The amplifier transistor 24 has the gate electrode connected to the FD portion 26 and the drain electrode connected to the pixel power source VDD. The amplifier transistor 24 outputs the electric potential of the FD portion 26 that has been reset by the reset transistor 23 to a reset level. In addition, the amplifier transistor 24 outputs the electric potential of the FD portion 26 after transmission of the signal electric charges, which is performed by the transmission transistor 22, as a signal level.

The selection transistor 25, for example, has the drain electrode connected to the source electrode of the amplifier transistor 24 and the source electrode connected to the vertical signal line 111. In addition, the gate electrode of the selection transistor 25 is connected to the selection control line 114. The selection transistor 25 is in the ON state so as to allow the unit pixel 20 to be in the selection state by applying a selection pulse SEL to the gate electrode thereof and outputs an electrical signal output from the amplifier transistor 24 to the vertical signal line 111.

In addition, the selection transistor 25 may be configured to be connected between the pixel power source VDD and the drain electrode of the amplifier transistor 24. The pixel circuit is not limited to the above-described four-transistor configuration. Thus, the pixel circuit may use a three-transistor configuration in which the selection transistor 25 is omitted, and the amplifier transistor 24 also serves as the selection transistor 25. Furthermore, a configuration in which the amplifier transistor 24 is shared among a plurality of the unit pixels may be used.

By referring back to FIG. 1, the vertical scanning unit 12 includes a line selection circuit 121 and a driver circuit 122. The line selection circuit 121 is configured by a shift register, an address decoder, or the like. The line selection circuit 121 generates pixel driving pulses such as a transmission pulse TRS, a reset pulse RST, and a selection pulse SEL that are used for vertical scanning of each unit pixel 20 of the pixel array unit 11 in the unit of one line under the control of the scanning control unit 15.

The driver circuit 122 supplies the transmission pulse TRS, the reset pulse RST, and the selection pulse SEL having predetermined voltage values for turning on/off the transistors 22, 23, and 25 of the unit pixel 20 in synchronization with the vertical scanning performed by the line selection circuit 121 to the unit pixel 20. In addition, the driver circuit 122 can perform a process of supplying the transmission pulse TRS having an intermediate voltage value (hereinafter, referred to as "intermediate voltage") between voltage values for turning on and off the transistors 22, 23, and 25 of the unit pixel 20 to the unit pixel 20 in synchronization with the vertical scanning.

The column signal processing unit 13 is singly disposed for each column of the pixel array unit 11. The column signal processing unit 13 performs predetermined signal processing for an electrical signal that is output from each unit pixel 20 positioned in a read line selected by vertical scanning through the vertical signal line 111. Accordingly, the column signal processing unit 13 generates a pixel signal corresponding to the signal electric charges read out from the unit pixel 20 and temporarily stores the generated pixel signal. For example, the column signal processing unit 13 reduces a pixel-specific fixed pattern noise such as a reset noise or a threshold variation of the amplifier transistor 24 by performing a CDS (Correlated Double Sampling) process as signal processing. In addition, the column signal processing unit 13 also performs an AD conversion process of converting an analog signal into a digital signal and the like.

The horizontal scanning unit 14 includes a column selecting circuit 141 and a signal reading circuit 142. The column selecting circuit 141 is configured by a shift register, an address decoder, or the like. The column selecting circuit 141 performs horizontal scanning for each pixel row of the pixel array unit 11, and thereby allowing the pixel signal temporarily stored in the signal processing unit 13 to be read out by the signal reading circuit 142 in the order of the horizontal scanning.

The signal reading circuit 142 is configured by a horizontal selection switch and the like. The signal reading circuit 142 sequentially reads out a pixel signal, which is temporarily stored in the column signal processing unit 13, for each pixel row in accordance with the horizontal scanning performed by the column selecting circuit 141 and outputs an image signal in the unit of one line.

The scanning control unit 15 scans the unit pixels 20 of the pixel array unit 11 in the unit of one line in the vertical direction by controlling the operations of the vertical scanning unit 12 and the horizontal scanning unit 14. In addition, the scanning control unit 15 outputs each pixel signal, which has been read out by the vertical scanning, in accordance with horizontal scanning. In addition, a plurality of exposure periods are arranged. When an image signal of each exposure period is output, the scanning control unit 15 allows the vertical scanning unit 12 to include selection of a line shifted from the position of the scanning order in the line selection for the scanning direction. As described above, by allowing the selection of a line that is shifted from the position of the scanning order to be included, the image signal of an image for each exposure period is sequentially output in the unit of one line from the horizontal scanning unit 14. For example, two exposure periods of a long time exposure period and a short time exposure period are arranged. Then, when an image signal of each exposure period is output, the scanning control unit 15 allows the vertical scanning unit 12 to include the selection of a line shifted in accordance with the short time exposure period from the position of the scanning order in the line selection for the scanning direction. As described above, by allowing the selection of the line shifted in accordance with the exposure period to be included, an image signal of an image for each exposure period is alternately output in the unit of one line from the horizontal scanning unit 14.

Configuration of Imaging Apparatus

Figure 3:
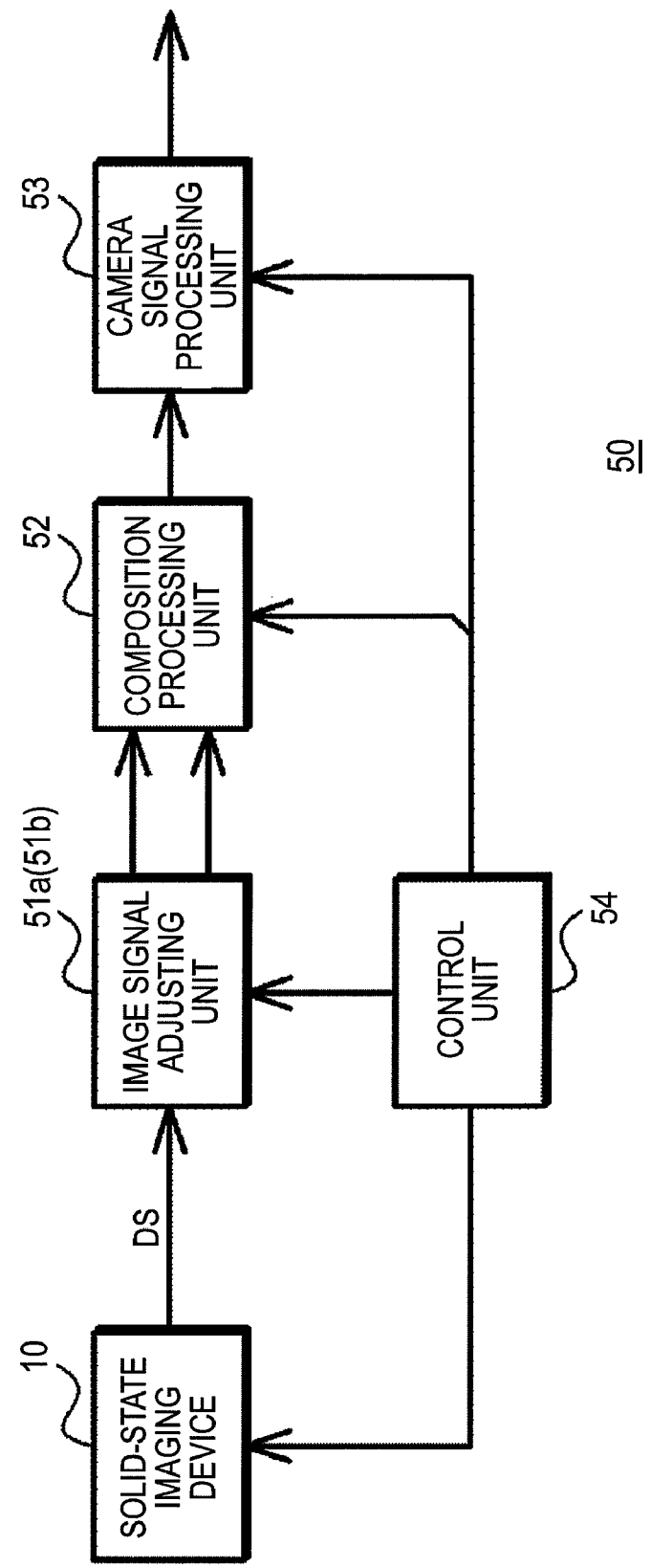
FIG. 3 is a diagram showing a configuration example of an imaging apparatus.

FIG. 3 shows a configuration example of an imaging apparatus. The imaging apparatus 50 includes a solid-state imaging device 10, an image signal adjusting unit 51a, a composition processing unit 52, a camera signal processing unit 53, and a control unit 54.

The image signal adjusting unit 51a divides the image signal output from the horizontal scanning unit 14 of the solid-state imaging device 10 into image signals for each exposure period and outputs the image signals for each exposure period with the timings thereof coinciding with one another. The image signal adjusting unit 51a is configured by using a memory such as a frame memory or a line memory, an FIFO, or the like. The image signal adjusting unit 51a controls writing of image data into the memory or reading the image data from the memory and outputs the image signals to the composition processing unit 52 by allowing the timings of the image signal for long time exposure and the image signal for short time exposure to coincide with each other.

The composition processing unit 52 generates an image signal of which the dynamic range is extended by composing an image signal for the short time exposure (hereinafter, referred to as a "short time exposure signal") and an image signal for the long time exposure (hereinafter, referred to as a "long time exposure signal") and outputs the generated image signal to the camera signal processing unit 53.

The camera signal processing unit 53 performs various camera signal processes by using an image signal supplied from the composition processing unit 52. For example, the camera signal processing unit 53 performs a signal process such as white balance adjustment, a demosaicing process, or image quality adjustment.

The control unit 54 controls the imaging apparatus 50 to perform an operation corresponding to a user's operation by generating a control signal corresponding to the user's operation and supplying the control signal to each unit of the imaging apparatus 50. In addition, the control unit 54 generates, for example, image signals of a long time exposure image and a short time exposure image by controlling the solid-state imaging device 10.

Operation of First Embodiment

Next, the operation of the first embodiment will be described. In the reading of the signal electric charges, read-out of pixels corresponding to one line for which long time exposure has been completed and read-out of pixels corresponding to one line for which short-time exposure has been completed are alternately performed by allowing selection of one line shifted from the position of the scanning order to be included in the line selection for the scanning direction. In addition, a line positioned far away from the position of the scanning order in accordance with another exposure period is selected, and thereby a read-out operation of signal electric charges of the selected line also serves as a reset operation for starting exposure of another exposure period other than the exposure period of the read-out signal electric charges.

FIGS. 4A to 4G represent timings of each signal line for reading out signal electric charges. FIG. 4A represents a selection pulse SEL_n. The selection pulse SEL_n is a selection signal used for selecting pixels of line (n). FIG. 4B represents a selection pulse SEL_n+1. The selection pulse SEL_n+1 is a selection signal used for selecting pixels of line (n+1). In addition, FIG. 4E represents a selection-pulse SEL_s. The selection pulse SEL_s is a selection signal used for selecting pixels of line (s). Here, the line (s) is a line that is shifted from the position of the scanning order. FIG. 4C represents a reset pulse RST_n. The reset pulse RST_n is a signal used for resetting the electric potential of the FD portions 26 of pixels of the line (n) to a predetermined electric potential. FIG. 4D represents a transmission pulse TRS_n. The transmission pulse TRS_n is a signal used for transmitting signal electric charges accumulated in the pixels of the line (n) to the FD portions 26.

Here, when the selection pulse SEL_n is in the high level "H", pixels of the line (n) are selected. Then, when the reset pulse RST_n is in the high level "H", the FD portions 26 of the pixels of line (n) are reset to a predetermined electric potential. Thereafter, when a predetermined exposure period elapses, the transmission pulse TRS_n is in the high level "H", and thereby the electric charges accumulated in the pixels of line (n) during a predetermined exposure period are transmitted to the FD portions 26.

As described above, when the pixels of line (n) are driven, a signal SIG represented in FIG. 4F is supplied to the column signal processing unit 13.

The column signal processing unit 13 calculates a difference between an electrical signal at the time of resetting the FD portion 26 and a signal at a time of transmission of the electric charges accumulated in the FD portion 26 during an exposure period, and thereby generating and temporarily storing a pixel signal from which a fixed variation noise between pixels is eliminated. The stored pixel signals are sequentially read out by the horizontal scanning performed by the horizontal scanning unit 14, and thereby the image signals are output.

After the process for the pixels of the line (n) is performed, the same process is performed for the pixels of the line (s) located in positions shifted in accordance with the exposure period. Accordingly, as the image signal DS transmitted from the horizontal scanning unit 14, as shown in FIG. 4G, a pixel signal of the line (s) is output after a pixel signal of the line (n) is output. In addition, the same process is performed also for the pixels of the line (n+1) after the pixels of the line (s), and for the pixels of line (s+1) after the pixels of the line (n+1). Thereafter, the same process is repeated, and thereby a long time exposure image and a short time exposure image are output alternately for each line.

FIGS. 5A to 5F are diagrams illustrating the operation of the first embodiment. The scanning control unit 15 arranges a plurality of exposure periods within one video frame period and sets the plurality of exposure periods to different lengths. The scanning control unit 15, for example, arranges two exposure periods of a long time exposure period and a short time exposure period within one video frame period in the order of the length of the period. In addition, the solid-state imaging device 10 performs the read-out of the long time exposure image and the read-out of the short time exposure image in an alternate manner for each line.

FIG. 5A shows a temporal change in the signal electric charges accumulated in a photo diode of a pixel of the line (n). In addition, FIG. 5B shows the operation of a pixel of the line (n). FIG. 5C shows the operation of a pixel of the line (n+1), and FIG. 5D shows the operation of a pixel of the line (s). In addition, FIG. 5E shows the operation of a pixel of the line (s+1), and FIG. 5F shows the image signal DS. In FIG. 5A, a broken line represents a high luminance portion, and a solid line represents a low luminance portion. In addition, Qsat represents the saturation level of the pixel.

In the pixel of the line (n), as shown in FIGS. 5A and 5B, the read out of the signal electric charges accumulated by the long time exposure is performed at time point t1, that is, a time point when the long time exposure period Tl elapses from time point to. In addition, a short time exposure period Ts is set so as to satisfy the condition of "Ts=Tf−Tl", and the read-out of the signal electric charges accumulated by the short time exposure is performed at time point t2, that is, a time point when one frame period elapses from the start of the long time exposure, that is, the time point to.

After the signal electric charges of the short time exposure are read out from the pixel of the line (n), the pixel of a line from which the signal electric charges of the long time exposure are to be read out is set to the pixel of the line (s). In addition, after read-out of the signal electric charges of the long time exposure is performed for the pixel of the line (s), read-out of the signal electric charges of the short time exposure is performed for the pixel of the line (n+1). After the read-out of the signal electric charges of the short time exposure is performed for the pixel of the line (n+1), read-out of the signal electric charges of the long time exposure is performed for the pixel of the line (s+1). By performing the read-out of signal electric charges as described above, the read-out of the signal electric charges is performed at timings represented in FIGS. 5B to 5E for each pixel of the line (n), the line (n+1), the line (s), and the line (s+1).

As described above, after the signal electric charges accumulated during the short time exposure period Ts are read out from the pixel of the line (n), the selection of the line (s) shifted from the position of the scanning order is included before the read-out of the signal electric charges accumulated during the short time exposure period Ts is performed for the pixel of the line (n+1). As described above, by including the selection of the line shifted from the position of the scanning order, the signal electric charges accumulated during the long time exposure period Tl can be read out. Accordingly, the image signal DS output from the solid-state imaging device 10, as shown in FIG. 5F, is a signal in which an image signal corresponding to one line, for which the long time exposure has been completed, and an image signal corresponding to one line, for which the short time exposure has been completed, are alternately output. In addition, the image signal of the long time exposure and the image signal of the short time exposure are respectively output in the unit of one line in the order of the vertical scanning direction.

FIG. 6 shows the line positions at time point t2. At the time point t2, the pixel of the line (n) is selected, and the signal electric charges of the short time exposure are read out. In addition, at the time point t2, a line located in a position in which "Ts=2×(s−n)×Th" from the line (n) corresponds to the line for which the long time exposure is completed. Accordingly, when the position shifted in accordance with the exposure period is set as the line (s), the signal electric charges of the long time exposure can be read out from the line (s) after the read-out of the signal electric charges of the short time exposure is performed from the line (n). Here, the operation of reading out the signal electric charges also serves as a reset operation at the start of the next exposure.

When the read-out of the signal electric charges is performed as described above, a time difference between readout of a short time exposure image and a long time exposure image coincides with the short time exposure period Ts, as shown in FIG. 5F. Accordingly, the time difference can be shortened, compared to a general method, that is, a method in which the long time exposure period Tl is set to a half period of one video frame period Tf, a shutter operation is performed when a period Tn elapses after read out of the signal electric charges accumulated during the long time exposure period Tl, and the signal electric charges accumulated during the short time exposure are read out when the short time exposure period Ts elapses.

In addition, the time difference can be shortened only by controlling the selection of a line from which the signal electric charges are read out. Thus, for example, a column signal processing unit that processes an electrical signal of long time exposure and a column signal processing unit that processes an electrical signal of short time exposure may not need to be disposed separately from each other. Accordingly, only by changing the operation of selecting a line, from which the signal electric charges are read out, in a general solid-state imaging device in which the column signal processing units are disposed for each pixel row of the pixel array unit 11, the general solid-state imaging device can be used. Therefore, the solid-state imaging device can be provided at a low price.

FIGS. 7A to 7D illustrate the operation of processing an image signal DS output from the solid-state imaging device 10. In FIGS. 7A to 7D, the image signal adjusting unit 51a, for example, is configured by two line memories 511a and 511b.

FIG. 7A represents a write operation of the line memory 511a. In addition, FIG. 7B represents a write operation of the line memory 511b. FIG. 7C represents a read operation of the line memory 511a, and FIG. 7D represents a read operation of the line memory 511b.

The image signal adjusting unit 51a sequentially selects image signals (long time exposure signals) of the long time exposure from the image signal DS and writes the selected image signal into the line memory 511a as shown in FIG. 7A. In addition, the image signal adjusting unit 51a sequentially selects image signals (short time exposure signals) of the short time exposure from the image signal DS and writes the selected image signal into the line memory 511b as shown in FIG. 7B.

The image signal adjusting unit 51a reads out the short time exposure signal written into the line memory 511b after a predetermined time td elapses from the writing thereof as shown in FIG. 7D. Here, the predetermined time td is a time interval equal to or longer than a time interval until a written image signal can be read out after the image signal is written into the line memory 511a or 511b.

In addition, as is apparent from FIGS. 5A to 5F, the short time exposure signal is delayed by the short time exposure period Ts from the long time exposure signal. Thus, the image signal adjusting unit 51a reads out the long time exposure signal written into the line memory 511a after "short time exposure period Ts+predetermined time td" elapses from the writing thereof as represented in FIG. 7C.

As described above, the image signal adjusting unit 51a can supply the long time exposure signal and the short time exposure signal to the composition processing unit 52 with the timings thereof coinciding with each other by controlling the writing of the image signals into the memory and the reading of the written signals based on the setting of the exposure periods. The information indicating the setting state of the exposure periods may be supplied from the solid-state imaging device 10 together with the image signal DS or may be supplied from the control unit 54.

Figure 8A:
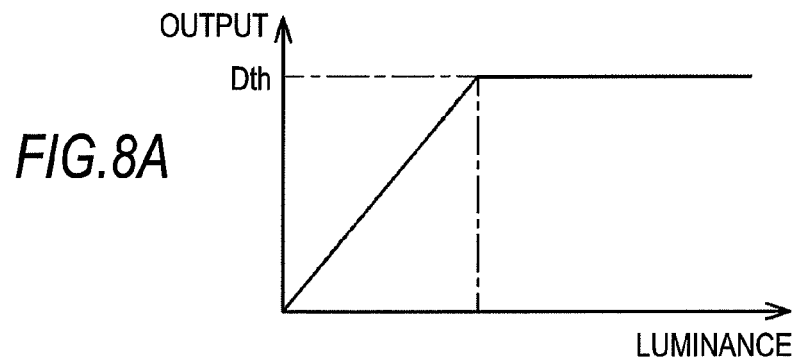
FIGS. 8A to 8C are diagrams illustrating a composition process.
Figure 8B:
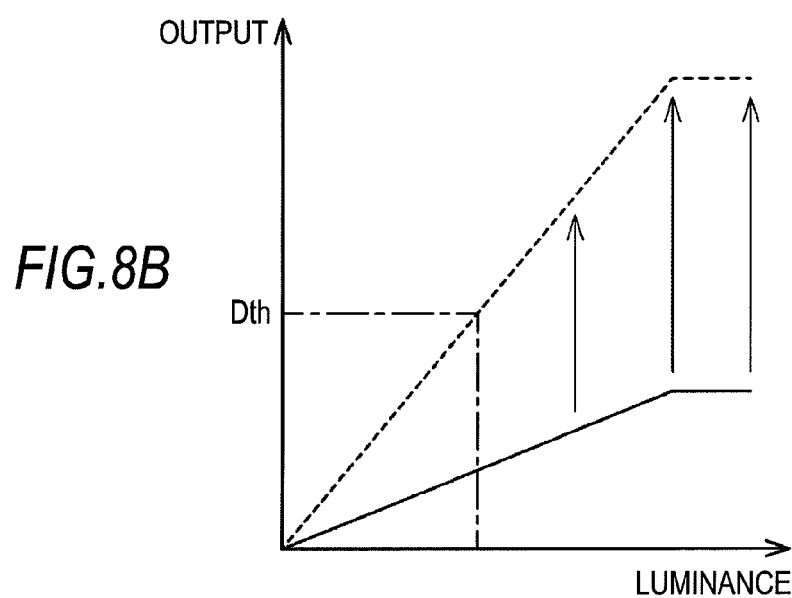
Figure 8C:
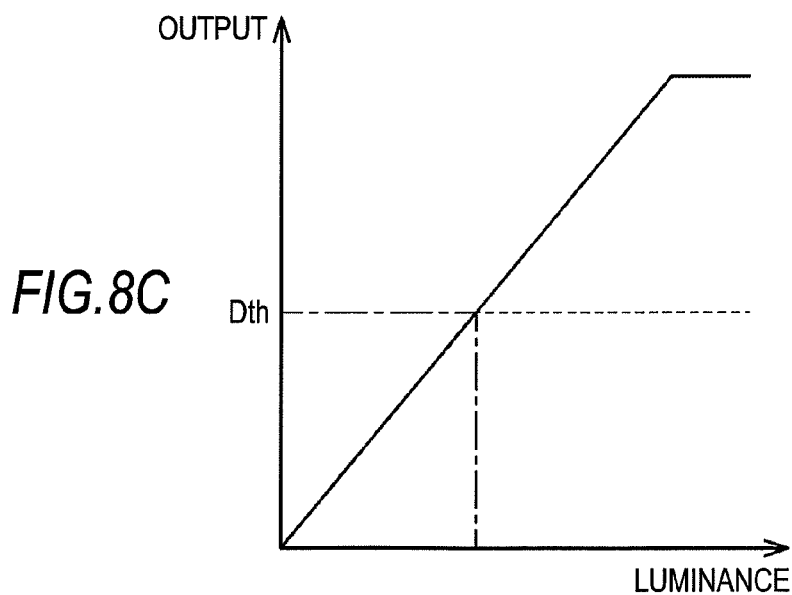

The composition processing unit 52 composes the long time exposure signal and the short time exposure signal for each video frame, and thereby generating an image signal having a wide dynamic range. FIGS. 8A to 8C are diagrams illustrating a composition process. FIG. 8A represents the relationship between the luminance of a subject and an output in the long time exposure. FIG. 8B represents the relationship between the luminance of a subject and an output in the short time exposure.

In the long time exposure, the exposure period is long, and accordingly, an image signal can be easily saturated even when the luminance of a subject is low. On the other hand, in the short time exposure, the exposure period is short, and accordingly, it is difficult for an image signal to be saturated even when the luminance of a subject is high. Thus, the composition processing unit 52, for example, compares a long time exposure signal (luminance value) with a threshold value, which is set in advance, for each pixel. When the long time exposure signal exceeds the threshold value, the composition processing unit 52 uses a short time exposure signal by converting the short time exposure signal into a long time exposure signal. Here, the long time exposure signal and the short time exposure signal have different luminance values and different signal levels. Accordingly, the short time exposure signal is used after being converted into a signal level corresponding to the long time exposure. For example, a short time exposure signal is used after being converted into a signal level corresponding to the long time exposure by multiplying the short time exposure signal by an exposure ratio of "Tl (long time exposure period)/Ts (short time exposure period)". In FIG. 8B, a broken line represents the relationship between the luminance of a subject and the output for a case where a short time exposure signal is converted into a signal level corresponding to the long time exposure.

FIG. 8C represents the relationship between the luminance of the subject and the output for a case where the composition process is performed. When the long time exposure signal is equal to or smaller than a threshold value Dth, the composition processing unit 52 uses the long time exposure signal. On the other hand, when the long time exposure signal exceeds the threshold value Dth, the composition processing unit 52 uses a short time exposure signal by converting the short time exposure signal into a signal level corresponding to the long time exposure. By performing such a composition process, as denoted by a solid line shown in FIG. 8C, an image signal having a wide dynamic range can be acquired.

By using the above-described technique, the time difference between reading of the short time exposure image and reading of the long time exposure image coincides with the short time exposure period Ts, and thereby the time difference can be shortened, compared to a general time (for example, Tf/2). Generally, the ratio of the long time exposure period to the short time exposure period is about 10 to 100. Thus, when one video frame period is 1/30 second, the time difference is 1/300 to 1/3000. In such a case, the width of a false-color area that appears in an edge portion or the like of the subject can be suppressed to 1/10 to 1/100 of a general case 1. Accordingly, the area in which the false color occurs can be much decreased. In addition, for a subject having a speed at which the subject does not move by a distance corresponding to the size of one pixel pitch on the imaging surface of the solid-state imaging device 10 within the time difference, the false color phenomenon does not substantially occur. Accordingly, the time difference can be decreased, and it can be configured that the false color phenomenon does not occur even when the subject moves at a high speed. In addition, for the same reason, the influence of an afterimage can be decreased. Furthermore, about 90% to 99% of one video frame period can be used as the long time exposure period. Accordingly, a long time exposure image having the sensitivity that is almost the same as that of a general solid-state imaging device can be acquired.

2. Second Embodiment

In the first embodiment, a case where an image signal having a wide dynamic range is generated by using a long time exposure signal and a short time exposure signal has been described. However the image signals that are used for generating the image signal having the wide dynamic range are not limited to the two signals of the long time exposure signal and the short time exposure signal. Next, as a second embodiment, a case where the image signal having the wide dynamic range is generated by using more than two image signals, for example, four image signals having different lengths of exposure periods will be described. In the second embodiment, a solid-state imaging device 10 is configured similarly to that in the first embodiment. In addition, an image signal adjusting unit 51a of an imaging apparatus 50 supplies four image signals to be composed to a composition processing unit 52 with the timings thereof coinciding with one another.

Operation of Second Embodiment

Next, the operation of a second embodiment will be described. A scanning control unit 15 allows selection of a line shifted in accordance with each exposure period from the position of the scanning order to be included in the line selection performed in the scanning direction by a vertical scanning unit 12, and thereby sequentially outputting the image signal for each exposure period in the unit of one line from a horizontal scanning unit 14. The four exposure periods having different lengths are set to a long time exposure period Tl and three short time exposure periods of Ts1 to Ts3 in the order of the lengths of the exposure periods. For example, the lengths of the exposure periods are assumed to satisfy the conditions of "Tl>Ts3>Ts2>Ts1" and Tf="Tl+Ts1+Ts2+Ts3".

FIGS. 9A to 9F are diagrams illustrating the operation of the second embodiment. FIG. 9A shows a temporal change in the signal electric charges accumulated in a photo diode of a pixel of line (n). In addition, FIG. 9B shows the operation of a pixel of line (n), and FIG. 9C shows the operation of a pixel of line (m). FIG. 9D shows the operation of a pixel of line (k). In addition, FIG. 9E shows the operation of a pixel of line (s), and FIG. 9F shows an image signal DS. In FIG. 9A, a broken line represents a high luminance portion, and a solid line represents a low luminance portion. In addition, Qsat represents the saturation level of the pixel.

For example, for the pixel of the line (n), as shown in FIGS. 9A and 9B, the read-out of the signal electric charges accumulated during the long time exposure period T1 is performed at time point t11, that is, a time point when the long time exposure period Tl elapses from time point t10. In addition, the read-out of the signal electric charges accumulated during the short time exposure period Ts3 is performed at time point t12, that is, a time point when the short time exposure period Ts3 elapses from the time point t11. The read-out of the signal electric charges accumulated during the short time exposure period Ts2 is performed at time point t13, that is, a time point when the short time exposure period Ts2 elapses from the time point t12. In addition, the read-out of the signal electric charges accumulated during the short time exposure period Ts1 is performed at time point t14, that is, a time point when the short time exposure period Ts1 elapses from the time point t13.

After the signal electric charges accumulated during the short time exposure period Ts1 are read out from the pixel of the line (n), the pixel of a line from which the signal electric charges accumulated during the short time exposure period Ts2 are to be read out is set to the pixel of the line (m). In addition, after the read-out of the signal electric charges accumulated during the short time exposure period Ts2 is performed, the pixel of a line from which the signal electric charges accumulated during the short time exposure period Ts3 are to be read out is set to the pixel of the line (k). After the read-out of the signal electric charges accumulated during the short time exposure period Ts3 is performed, the pixel of a line from which the signal electric charges accumulated during the long time exposure period Tl are to be read out is set to the pixel of the line (s).

By performing the read-out of signal electric charges as described above, the read-out is performed for each pixel of the lines (n), (m), (k), and (s) at timings represented in FIGS. 9B to 9E. In other words, after the signal electric charges accumulated during the short time exposure period Ts1 are read out from the pixel of the line (n), selection of lines (m), (k), and (s) shifted from the position of the scanning order is included before the read out of the signal electric charges accumulated during the short time exposure period Ts1 from the pixel of the line (n+1). By performing the line section as described above, the signal electric charges accumulated during the short time exposure period Ts2, the signal electric charges accumulated during the short time exposure period Ts3, and the signal electric charges accumulated during the long time exposure period Tl can be read out.

Accordingly, the image signal DS output from the solid-state imaging device 10, as shown in FIG. 9F, is a signal in which images corresponding to one line, for which each exposure period has been completed in the order of the short time exposure periods Ts1 to Ts3 and the long time exposure period Tl, are sequentially output. In addition, the image signal of the long time exposure and the image signals of the short time exposure are respectively output in the unit of one line in the order of the vertical scanning direction.

FIG. 10 shows the line positions at time point t14. At the time point t14, the pixel of the line (n) is selected, and the signal electric charges accumulated during the short time exposure period Ts1 are read out. FIG. 10 shows the pixel of the line (m) from which the signal electric charges accumulated during the short time exposure period Ts2 are read out after the read-out of the signal electric charges from the pixel of the line (n). In addition, FIG. 10 shows the pixel of the line (k) from which the signal electric charges accumulated during the short time exposure period Ts3 are read out after the read-out of the signal electric charges from the pixel of the line (m). Furthermore, FIG. 10 shows the pixel of the line (s) from which the signal electric charges accumulated during the long time exposure period Tl are read out after the read-out of the signal electric charges from the pixel of the line (k).

When being set as below, the pixels of the lines (m), (k), and (s) can sequentially read out signal electric charges accumulated in each exposure period in the order of the short time exposure periods Ts1 to Ts3 and the long time exposure period Tl. The read-out operation of the signal electric charges also serves as a reset operation at the start of the next exposure.

Here, in a case where the number of exposure periods in one video frame period is G by disposing a plurality of the short time exposure periods, the short time exposure period Ts is set so as to satisfy Equation (1).

$$Ts=(G \times N+(G-1)) \times Th \quad (1)$$

In Equation (1), N=0, 1, 2, . . . .

As represented in FIGS. 9A to 9F, in a case where three short time exposure periods and one long time exposure period are arranged, there are four exposure periods in one video frame period, and thus G=4. In addition, the short time exposure period Ts is set so that N has a desired value. In addition, in accordance with the setting of N, the line (m) for the line (n), the line (k) for the line (m), and the line (s) for the line (k) are determined.

Here, two lines having an interval of the short time exposure period Ts are set such that a value acquired by subtracting "1" from a subtracted value of line numbers is N. In other words, the line (m) for the line (n) is set such that the value of "m−n−1" is the value of N at the time when the short time exposure period Ts1 is set. The line (k) for the line (m) is set such that the value of "k−m−1" is the value of N at the time when the short time exposure period Ts2 is set. In addition, the line (s) for the line (k) is set such that the value of "s−k−1" is the value of N at the time when the short time exposure period Ts3 is set.

For example, the short time exposure period Ts1 is set to 3 Th as N=0, the short time exposure period Ts2 is set to 7 Th as N=1, and the short time exposure period Ts3 is set to 11 Th as N=2. In such a case, the line (m) is the line (n+1), the line (k) is the line (n+3), and the line (s) is the line (n+6).

Here, read-out of signal electric charges accumulated during the short time exposure period Ts1 is performed from the line (n), and then read-out of signal electric charges accumulated during the short time exposure period Ts2 is performed from the line (m=n+1). Next, read-out of signal electric charges accumulated during the short time exposure period Ts3 is performed from the line (k=n+3), and then read-out of signal electric charges accumulated during the long time exposure period Tl is performed from the line (s=n+6). Thereafter, signal electric charges are read out from a line (n+1) that is positioned next to the line (n) for which the readout of the signal electric charges accumulated during the short time exposure period Ts1 has been performed. At this time, since "3 Th" has elapsed from the read-out of the signal electric charges accumulated during the short time exposure period Ts2, the read-out of the signal electric charges accumulated during the short time exposure period Ts1 can be performed for the line (n+1). In other words, the read-out operation of the signal electric charges also serves as a reset operation at the start of the next exposure.

In addition, signal electric charges accumulated during the short time exposure period Ts1 is performed from the line (n+2), and then, signal electric charges are read out from the line (m+2). At this time, since "7 Th" has elapsed from the read-out of the signal electric charges accumulated during the short time exposure period Ts3, the read-out of the signal electric charges accumulated during the short time exposure period Ts2 can be performed for the line (m+2). In other words, the read-out operation of the signal electric charges also serves as a reset operation at the start of the next exposure.

In addition, signal electric charges accumulated during the short time exposure period Ts1 is performed from the line (n+3), and then, signal electric charges accumulated during the short time exposure period Ts2 are read out from the line (m+3). In addition, signal electric charges are read out from the line (k+3). At this time, since "11 Th" has elapsed from the read-out of the signal electric charges accumulated during the long time exposure period Tl, the read-out of the signal electric charges accumulated during the short time exposure period Ts3 can be performed for the line (k+3). In other words, the read-out operation of the signal electric charges also serves as a reset operation at the start of the next exposure.

When the lines (n), (m), (k), and (s) are set as described above, as represented in FIG. 9F, the image signals of the short time exposure periods Ts1 to Ts3 and the long time exposure period Tl can be sequentially output for each line. In addition, the read-out operation of signal electric charges also serves as a reset operation at the start of the next exposure. When the read-out of the signal electric charges is performed as described above, a time difference between read-out of an image of each of the short time exposure periods Ts1 to Ts3 and read-out of a long time exposure image period Tl coincides with each exposure period. Accordingly, the time difference can be shorted, compared to a case where a general method is used.

In a case where setting four exposure periods and generating an image signal having a wide dynamic range by using the image signals of each exposure period, the image signal adjusting unit 51a of the imaging apparatus 50 supplies image signals to the composition processing unit 52 with the timings of the image signals of the exposure periods coinciding with one another. For example, the image signal adjusting unit 51a of the imaging apparatus 50 supplies the image signals to the composition processing unit 52 with the timings of the image signals coinciding with one another by using four line memories.

The composition processing unit 52 composes the image signals of the four exposure periods having different lengths for each video frame, and thereby generating an image signal having a wide dynamic range. In addition, in the composition of the image signals, when the luminance of the subject is high, an image signal of a short exposure period is used, by using a threshold value or an exposure ratio as described above. On the other hand, when the luminance of the subject is low, an image signal of a long exposure period is used.

As described above, in a case where the exposure ratio for composing four image signals, for example, is set to 10, 100, or 1000 times with reference to the long time exposure side, the time difference between read-out of a long time exposure image and read-out of a short time exposure image is about 1/300 second. Accordingly, the time difference can be shortened markedly, compared to a general case. On the other hand, about 90% of one video frame period can be acquired as the long time exposure period. In FIGS. 9A to 9F, setting of the short time exposure periods is arranged in the order of the long time exposure. However, the order can be appropriately changed.

3. Third Embodiment

Next, in resetting the signal electric charges for accumulation of electric charges during the short time exposure, a case where the exposure period is set to one video frame period for a subject having low luminance without being influenced by resetting the short time exposure by setting at least one or more resetting operations for resetting a part of the signal electric charges by applying an intermediate voltage to a unit pixel will be described. According to a third embodiment, the read-out of signal electric charges of the long time exposure that are accumulated after resetting the signal electric charges and the read-out of the signal electric charges of the short time exposure that are accumulated after resetting a part of the signal electric charges by applying the intermediate voltage are performed in a combined manner. In addition, after read-out of the signal electric charges of the short time exposure is performed, read-out of signal electric charges of the long time exposure is performed. In the third embodiment, a solid-state imaging device 10 and an image signal adjusting unit 51a of the imaging apparatus 50 are configured to be the same as those of the first embodiment.

Operation of Third Embodiment

Next, the operation of the third embodiment will be described. Similarly to the first and second embodiments, by allowing selection of a line shifted from the position of the scanning order to be included in the line selection for the scanning direction, read-out of pixels corresponding to one line for which the long time exposure has been completed and read-out of pixels corresponding to one line for which the short time exposure has been completed are alternately performed in the read-out of signal electric charges. In addition, the amount of shift is set in accordance with the exposure period, and the read-out operation of the signal electric charges also serves as a reset operation at the start of the next exposure.

FIGS. 11A to 11F are diagrams illustrating the operation of the third embodiment. FIG. 11A shows a temporal change in the signal electric charges accumulated in a photo diode of a pixel of line (n) for a low luminance portion and a high luminance portion. In addition, FIG. 11B shows the operation of a pixel of line (n), and FIG. 11C shows the operation of a pixel of line (n+1). FIG. 11D shows the operation of a pixel of line (s). In addition, FIG. 11E shows the operation of a pixel of line (s+1), and FIG. 11F shows an image signal DS. In FIG. 11A, a broken line represents a high luminance portion, and a solid line represents a low luminance portion. In addition, Qsat represents the saturation level of the pixel, and Qmid represents a difference between the saturation level Qsat and an intermediate voltage of the pixel.

For example, for the pixel of the line (n), as shown in FIGS. 11A and 11B, the read-out of the signal electric charges accumulated by the long time exposure is performed at time point t23, that is, a time point when the long time exposure period Tl (T1=Tf) elapses from time point t20. In addition, a short time exposure period Ts and a time difference Tr are set, and the read-out of signal electric charges accumulated by the short time exposure is performed at time point t22 that is earlier by the time difference Tr than a time point when the read-out of the signal electric charges accumulated by the long time exposure is performed. Accordingly, reset of the signal electric charges for accumulation of electric charges of the short time exposure is performed at time point t21 that is earlier by the short time exposure period Ts than the time point t22. As described above, the read-out of a part of the signal electric charges is performed in the order of the setting of the plurality of exposure periods, and then read-out of all the signal electric charges is performed.

After the signal electric charges of the long time exposure are read out from the pixel of the line (n), the pixel of a line from which the signal electric charges of the short time exposure are to be read out is set to the pixel of the line (s). In addition, after the read-out of the signal electric charges of the short time exposure is performed for the line (s), read-out of signal electric charges of the long time exposure is performed for the pixel of the line (n+1). Then, after the read-out of the signal electric charges of the long time exposure is performed for the line (n+1), read-out of signal electric charges of the short time exposure is performed for the pixel of the line (s+1). By performing the read-out of signal electric charges as described above, the read-out is performed for each pixel of the lines (n), (n+1), (s), and (s+1) at timings represented in FIGS. 11B to 11E. In addition, the read-out operation of the signal electric charges also serves as a reset operation at the start of the next exposure.

Accordingly, the image signal DS output from the solid-state imaging device 10, as shown in FIG. 11F, is a signal in which an image corresponding to one line, for which the long time exposure has been completed, and an image corresponding to one line, for which the short time exposure has been completed are alternately read out. In addition, the image signal of the long time exposure and the image signal of the short time exposure are respectively output in the unit of one line in the order of the vertical scanning direction.

When the read-out of the signal electric charges is performed as described above, a time difference between the read-out of signal electric charges accumulated by the short time exposure and the read-out of signal electric charges accumulated by the long time exposure is the time difference Tr. Accordingly, when the time difference Tr is decreased, the time difference between a long time exposure image and a short time exposure image can be shortened.

FIG. 12 shows the line positions at time point t23. At the time point t23, the pixel of the line (n) is selected, and the signal electric charges accumulated by the long time exposure are read out. In addition, in FIG. 12, a row corresponding to the pixel of the line (s) from which the signal electric charges accumulated by the short time exposure are read out after the read-out of the signal electric charges from the pixel of the line (n) and a timing at which reset is performed is denoted by a shutter line (sh).

By using the setting as described above, a time difference between a long time exposure image and a short time exposure image can be shortened by decreasing the time difference Tr. Accordingly, similarly to the first embodiment, an area in which a false color or an afterimage is generated can be decreased.

As the time difference Tr is decreased further, the reset timing is positioned closer to the read-out timing of the signal electric charges accumulated by the long time exposure. Here, a part of the signal electric charges is ejected by applying the intermediate voltage to the unit pixel in a resetting operation. Thus, the electric charges accumulated by the long time exposure are ejected unless the luminance of the subject is low. In other words, a maximum value of the signal electric charges that is taken by the long time exposure is decreased, and accordingly, the number of cases where a short time exposure image is used is increased. In addition, when the image signal of the short time exposure image is amplified by the exposure ratio, the noise component is amplified as well, and thereby the S/N deteriorates, compared to that of the long time exposure image. Accordingly, the time difference Tr is set such that the deterioration of the image quality is not notable. In FIGS. 11A to 11F, the intermediate voltage has one level. However, a plurality of the intermediate voltages may be arranged, or the intermediate voltage may be configured to be changeable.

By performing the above-described operation, the long time exposure period can be set to one video frame period. Accordingly, the sensitivity of a low-illumination scene can be raised, and thereby a high-quality image having a high S/N can be acquired. In addition, for a scene having high illumination, an image having low saturation can be acquired. Furthermore, for a scene having high contrast in which a low illumination portion and a high illumination portion are mixed together, the saturation of the high-illumination portion can be avoided while a high S/N maintained in the low illumination portion. In addition, by decreasing the time difference between the read-out of the short time exposure and the read-out of the long time exposure, it is possible to decrease generation of a false color or an afterimage.

4. Fourth Embodiment

In a fourth embodiment, a case where only a part of signal electric charges is ejected in resetting the signal electric charges for accumulating electric charges of the short time exposure, and, for example, three short time exposure periods having different lengths are arranged as the short time exposure periods will be described. In addition, according to the fourth embodiment, a solid-state imaging device 10 is configured to be the same as that of the first embodiment. In addition, an image signal adjusting unit 51a of the imaging apparatus 50 supplies image signals of four images to be composed to a composition processing unit 52 in synchronization with one another. A case where only ejection of signal electric changes is performed by using a same level in resetting the signal electric charges for accumulation of signal electric charges of the short time exposure for each short time exposure will be described as below.

Operation of Fourth Embodiment

Next, the operation of the fourth embodiment will be described. A scanning control unit 15 allows selection of a line shifted in accordance with each exposure period from the position of the scanning order to be included in the line selection performed in the scanning direction by a vertical scanning unit 12, and thereby sequentially outputting the image signal for each exposure period in the unit of one line from a horizontal scanning unit 14. The four exposure periods having different lengths are set to a long time exposure period Tl and three short time exposure periods of Ts1 to Ts3 in the order of the lengths of the exposure periods. For example, the lengths of the exposure periods are assumed to satisfy the conditions of "Ts3<Ts2<Ts1" and "Tf>Tr+Ts1+Ts2+Ts3". In addition, the long time exposure period Tl is assumed to satisfy the condition of "Tl=Tf".

FIGS. 13A to 13G are diagrams illustrating the operation of the fourth embodiment. FIG. 13A shows a temporal change in the signal electric charges accumulated in a photo diode of a pixel of line (n). In addition, FIG. 13B shows the operation of a pixel of line (n), and FIG. 13C shows the operation of a pixel of line (n+1). FIG. 13D shows the operation of a pixel of line (m). In addition, FIG. 13E shows the operation of a pixel of line (k), and FIG. 13F shows the operation of the pixel of line (s). In addition, FIG. 13G represents an image signal DS.

For example, for the pixel of the line (n), as shown in FIGS. 13A and 13B, the read-out of the signal electric charges accumulated during the long time exposure period Tl is performed at time point t35, that is, a time point when the long time exposure period Tl elapses from time point t30. In addition, the read-out of the signal electric charges accumulated during the short time exposure period Ts1 is performed at time point t34, that is, a time point earlier by the time difference Tr than a time point when the signal electric charges accumulated by the long time exposure are read out. In addition, the read-out of the signal electric charges accumulated during the short time exposure period Ts2 is performed at time point t33, that is, a time point earlier by the short time exposure period Ts1 than the time point t34. The read-out of the signal electric charges accumulated during the short time exposure period Ts3 is performed at time point t32 that is earlier by the short time exposure period Ts2 than the time point t33. Furthermore, reset of the signal electric charges is performed at time point t31 that is a time point earlier by the short time exposure period Ts3 than the time point t32. As described above, read-out of a part of the signal electric charges is performed in the order of the setting of the plurality of exposure periods, and then read-out of all the signal electric charges is performed.

After the signal electric charges accumulated during the long time exposure period Tl are read out from the pixel of the line (n), the pixel of a line from which the signal electric charges accumulated during the short time exposure period Ts1 are to be read out is set to the pixel of the line (m), and the signal electric charges are read out from the pixel of the line (m). In addition, after the read-out of the signal electric charges accumulated during the short time exposure period Ts1 is performed, the pixel of a line from which the signal electric charges accumulated during the short time exposure period Ts2 are to be read out is set to the pixel of the line (k), and the signal electric charges are read out from the pixel of the line (k). After the read-out of the signal electric charges accumulated during the short time exposure period Ts2 is performed, the pixel of a line from which the signal electric charges accumulated during the short time exposure period Ts3 are to be read out is set to the pixel of the line (s), and the signal electric charges are read out from the pixel of the line (s). In addition, after the read-out of the signal electric charges accumulated during the short time exposure period Ts3 is performed, the pixel of a line from which the signal electric charges accumulated during the long time exposure period Tl are to be read out is set to the pixel of the line (n+1), and the signal electric charges are read out from the pixel of the line (n+1).

By performing the read-out of signal electric charges as described above, the read-out is performed for each pixel of the lines (n), (m), (k), and (s) at timings represented in FIGS.

13B to 13F. Accordingly, the image signal DS output from the solid-state imaging device 10, as shown in FIG. 13G, is a signal in which images corresponding to one line, for which each exposure period has been completed in the order of the short time exposure periods Ts1 to Ts3 and the long time exposure period Tl, are sequentially output. In addition, the image signal of the long time exposure and the image signals of the short time exposure are respectively output in the unit of one line in the order of the vertical scanning direction.

Figure 14:
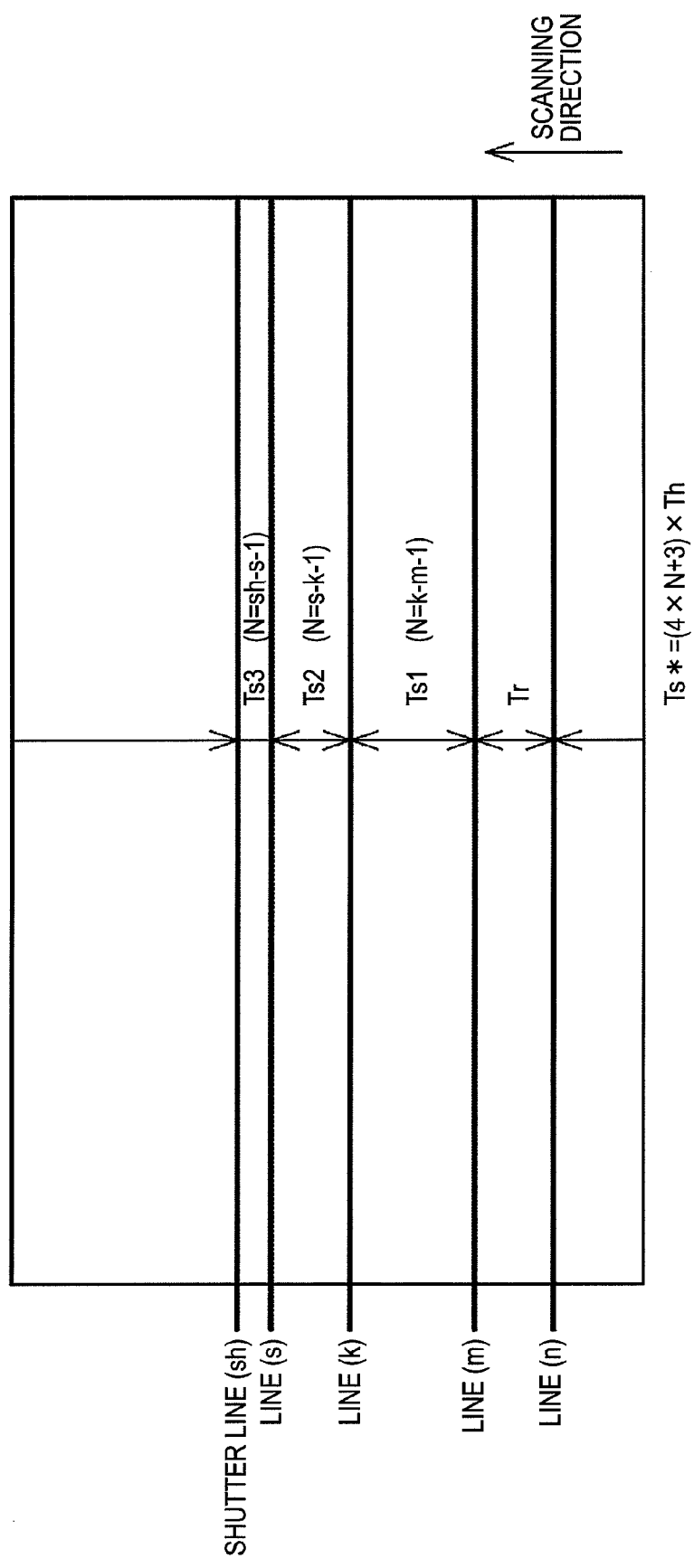
FIG. 14 is a diagram showing line positions at time point t35.
Figure 15:
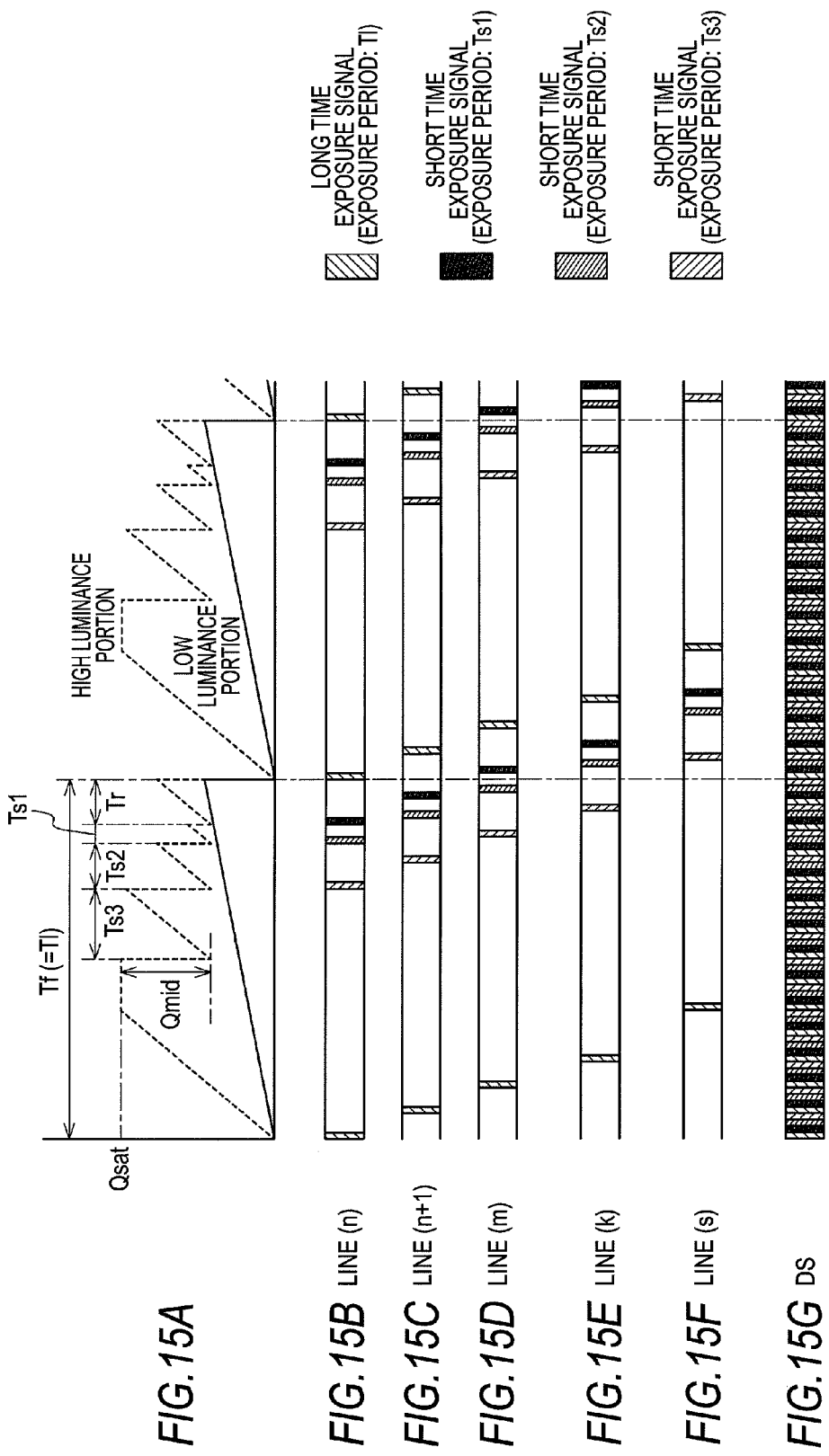
FIGS. 15A to 15G are diagrams illustrating another operation of the fourth embodiment.

Here the pixels of the lines (m), (k), and (s) are set as described with reference to FIGS. 9A to 9F and FIG. 10. FIG. 14 shows the line positions at time point t35. The line (m) for the line (n) is set such that the value of "m−n−1" is the value of N at the time when the time difference Tr is set. The line (k) for the line (m) is set such that the value of "k−m−1" is the value of N at the time when the short time exposure period Ts1 is set. In addition, the line (s) for the line (k) is set such that the value of "s−k−1" is the value of N at the time when the short time exposure period Ts2 is set. The shutter line (sh) for the line (s) is set such that the value of "sh-s-1" is the value of N at the time when the short time exposure period Ts3 is set. In addition, the shutter line (sh) is a line for which a reset operation is performed and ejects a part of the signal electric charges by being reset.

When the lines (n), (m), (k), and (s) and the shutter line (sh) are set as described above, image signals of the lines for which exposure has been performed during the short time exposure periods Ts1 to Ts3 and the long time exposure time T1 can be sequentially output as shown in FIG. 13F.

In a case where an image signal adjusting unit 51a of the imaging apparatus 50 sets four exposure periods having different lengths and generates an image signal having a wide dynamic range by using image signals of each exposure period, the image signal adjusting unit 51a supplies four image signals to a composition processing unit 52 with the timings thereof coinciding with one another, for example, by using four line memories.

The composition processing unit 52 composes the image signals of the four exposure periods having different lengths for each video frame, and thereby generating an image signal having a wide dynamic range. In addition, in the composition of the image signals, when the luminance of the subject is high, an image signal of a short exposure period is used, by using a threshold value or an exposure ratio as described above. On the other hand, when the luminance of the subject is low, an image signal of a long exposure period is used.

Accordingly, similarly to the third embodiment, the long time exposure period can be set to one video frame period. Therefore, the sensitivity of a dark portion can be raised. In addition, by decreasing the time difference between read-out of the short time exposure and read-out of the long time exposure, generation of a false color or an afterimage can be decreased. Furthermore, an image signal having a wide dynamic range can be acquired.

In FIGS. 13A to 13G, the short time exposure periods are sequentially arranged from a shortest exposure period to a longest exposure period in the direction of time. However, the order may be appropriately changed. FIGS. 15A to 15G represent another read-out operation for a long time exposure image and a plurality of short time exposure images in a case where only a part of the signal electric charges is ejected by resetting the signal electric charges. FIGS. 15A to 15G represent a case where exposure periods are arranged from a longest short time exposure period having the longest exposure period to a shortest short time exposure period having the shortest exposure period in the order of the length of the exposure period in the direction of time. Even in such a case, the long time exposure period can be set to one video frame period, and accordingly, the sensitivity of a dark portion can be raised. In addition, by decreasing the time difference between the read-out of the short time exposure and the read-out of the long time exposure, generation of a false color or an afterimage can be decreased.

5. Fifth Embodiment

Next, an embodiment in which generation of a false color or an afterimage in a subject is suppressed by decreasing the time difference between an exposure period of the long time exposure and an exposure period of the short time exposure will be described.

According to the fifth embodiment, in a case where a short time exposure image and a long time exposure image are read out by performing different sweeping operations, a combination of a sweeping operation for short time exposure and a sweeping operation for long time exposure is continuously repeated several times within one video frame period. By continuously repeating the combination of the sweeping operations for the short time exposure and the longtime exposure several times, the time difference between the exposure period for the long time exposure and the exposure period for the short time exposure is decreased.

In a case where the combination of the continuous sweeping operations for the short time exposure and the long time exposure is repeated several times within one video frame period, the image signal adjusting unit shown in FIG. 3 generates an image signal of one picked up image within one video frame period by performing calculation using image signals of long time exposure within one video frame period several times. In addition, the image signal adjusting unit generates an image signal of one picked-up image within one video frame period by performing calculation using image signals of the short time exposure within one video frame period several times. Furthermore, the image signal adjusting unit outputs image signals of the long time exposure and the short time exposure after the calculation to the composition processing unit with the timings thereof coinciding with each other.

Figure 16:
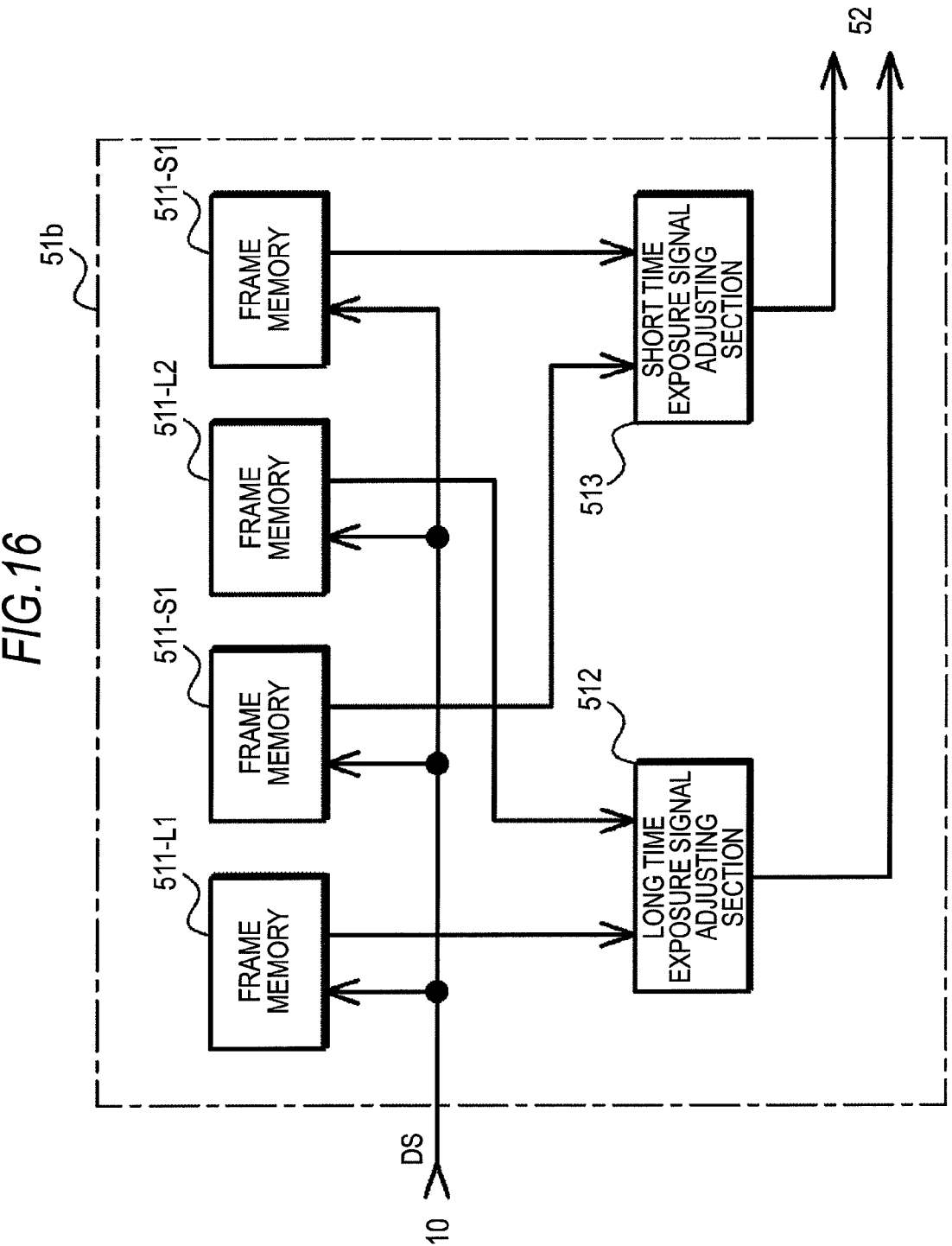
FIG. 16 is a diagram showing another configuration of an image signal adjusting unit.

FIG. 16 is another configuration of the image signal adjusting unit and shows the configuration for a case where a combination of sweeping of the short time exposure and sweeping of the long time exposure, which are continuous within one video frame period, for example, is repeated twice. An image signal adjusting unit 51b includes frame memories 511-L1, 511-L2, 511-S1, and 511-S2, a long time exposure signal adjusting section 512, and a short time exposure signal adjusting section 513.

The frame memory 511-L1 is a memory used for storing a first long time exposure signal within one video frame period. The frame memory 511-S1 is a memory used for storing a first short time exposure signal within one video frame period. In addition, the frame memory 511-L2 is a memory used for storing a second long time exposure signal within one video frame period. The frame memory 511-S2 is a memory used for storing a second short time exposure signal within one video frame period.

The long time exposure signal adjusting section 512 generates an image signal of one picked up a long time exposure image within one video frame period from image signals of the long time exposure that are stored in the frame memories 511-L1 and 511-L2. The long time exposure signal adjusting section 512, for example, calculates an added value of the image signal of the long time exposure that is stored in the frame memory 511-L1 and the image signal of the long time exposure that is stored in the frame memory 511-L2 for each pixel. The long time exposure signal adjusting section 512 sets the calculated added value as the image signal of the long time exposure within one video frame period.

The short time exposure signal adjusting section 513 generates an image signal of one picked up a short time exposure image within one video frame period from image signals of the short time exposure that are stored in the frame memories 511-S1 and 511-S2. The short time exposure signal adjusting section 513, for example, calculates an added value of the image signal of the short time exposure that is stored in the frame memory 511-S1 and the image signal of the short time exposure that is stored in the frame memory 511-S2 for each pixel. The short time exposure signal adjusting section 513 sets the calculated added value as the image signal of the short time exposure within one video frame period.

The long time exposure signal adjusting section 512 and the short time exposure signal adjusting section 513 output the image signal of the long time exposure and the image signal of the short time exposure within one video frame period to the composition processing unit 52 with the timings thereof coinciding with each other. In addition, the long time exposure signal adjusting section 512 and the short time exposure signal adjusting section 513 calculate image signals within one video frame period by performing an addition process. However, the long time exposure signal adjusting section 512 may be configured to average the image signals of the long time exposure within one video frame period so as to be used as the image signal of the long time exposure within one video frame period. In addition, the short time exposure signal adjusting section 513 may be configured to average the image signals of the short time exposure within one video frame period so as to be used as the image signal of the short time exposure within one video frame period. In the fifth embodiment, a solid-state imaging device 10 is configured to be the same as that of the first embodiment.

Operation of Fifth Embodiment

Next, the operation of a fifth embodiment will be described. FIGS. 17A to 17F represent the operation of the fifth embodiment.

Figure 17:
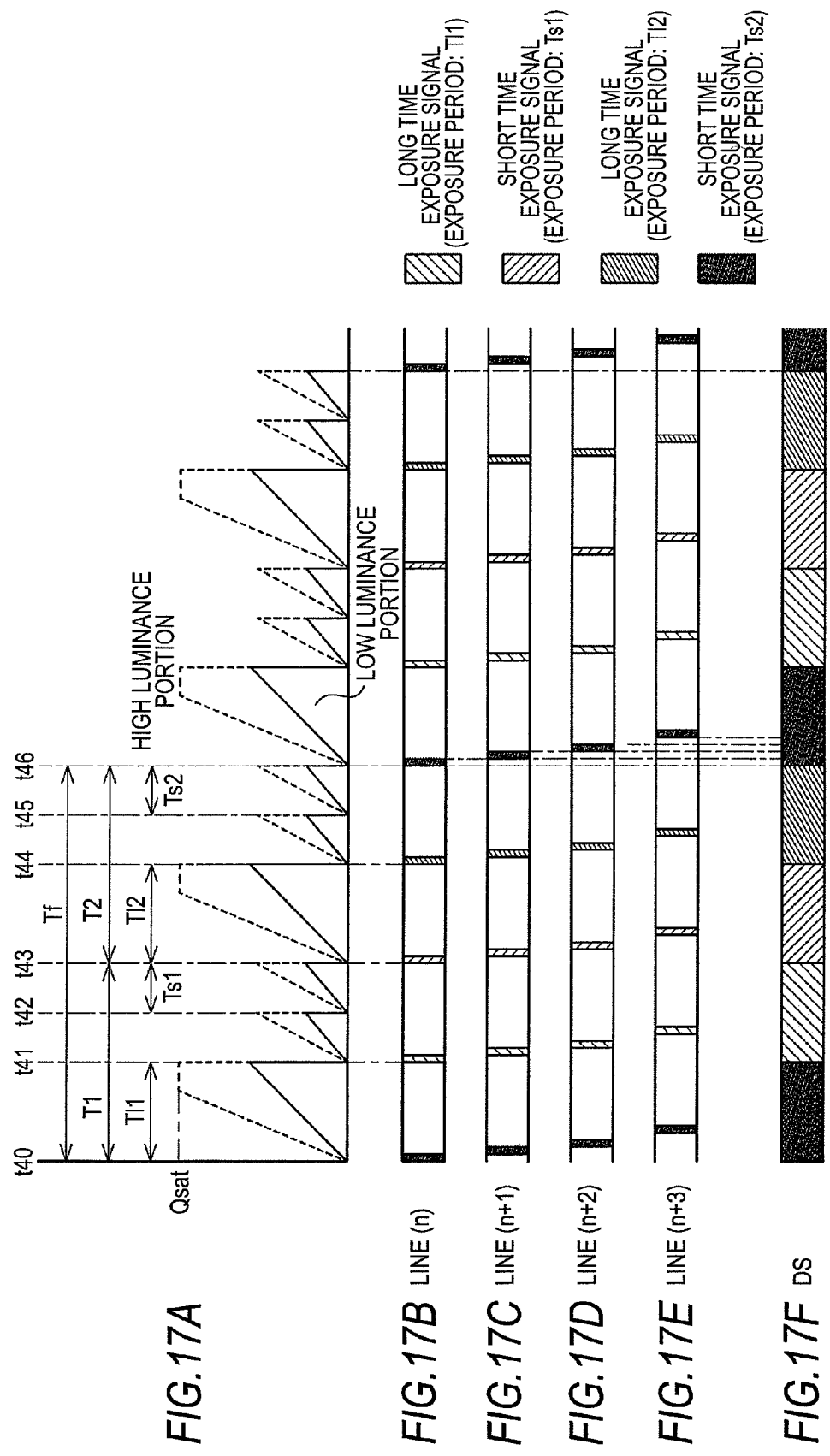
FIGS. 17A to 17F are diagrams illustrating the operation of a fifth embodiment.

FIG. 17A shows a temporal change in the signal electric charges accumulated in a photo diode of a pixel of line (n). In addition, FIG. 17B shows the operation of a pixel of line (n). FIG. 17C shows the operation of a pixel of line (n+1), and FIG. 17D shows the operation of a pixel of line (n+2). In addition, FIG. 17E shows the operation of a pixel of line (n+3), and FIG. 17F shows an image signal.

According to the fifth embodiment, by respectively performing the sweeping operation of the long time exposure and the sweeping operation of the short time exposure at a double speed, a combination of the sweeping of the short time exposure and the sweeping of the long time exposure are continuously performed twice within one video frame period Tf. In such a case, the first combination of the sweeping of the short time exposure and the sweeping of the long time exposure is performed in a period T1 that is a half of one video frame period Tf, and the second combination of the sweeping of the short time exposure and the sweeping of the long time exposure is performed in a period T2 that is a half of one video frame period Tf. Here, for example, in a case where the first and second long time exposure periods T11 and T12 are set to a quarter period of one video frame period Tf, the read-out of signal electric charges accumulated during the long time exposure period T11 is performed at time point t41 that is a time point when the long time exposure period T11 elapses from time point t40. In addition, the read-out of signal electric charges accumulated during the short time exposure period Ts1 is performed at time point t43 that is a time point when the period T1, which is a half of one video frame period Tf, elapses from the time point t40. In addition, the reset of the signal electric charges used for accumulation of signal electric charges of the short time exposure is performed at time point t42 that is earlier than the time point t43 by the short time exposure period Ts1.

Similarly, the read-out of signal electric charges accumulated during the long time exposure period T12 is performed at time point t44 that is a time point when the long time exposure period T12 elapses from the time point t43. In addition, the read-out of signal electric charges accumulated during the short time exposure period Ts2 is performed at time point t46 that is a time point when the period T2, which is a half of one video frame period Tf, elapses from the time point t43. Furthermore, the reset of the signal electric charges used for accumulation of signal electric charges of the short time exposure is performed at time point t45 that is earlier than time point t46 by the short time exposure period Ts2.

When such a line reading operation is sequentially performed from the pixel of the first line, as represented in FIGS. 17B to 17E, signals of line (n+1) to (n+3) are read out following the signal of the line (n). Accordingly, the output from the solid-state imaging device, as represented in FIG. 17F, data corresponding to one screen of the long time exposure and data corresponding to one screen of the short time exposure are alternately output twice in one video frame period Tf.

The image signals of the long time exposure and the short time exposure, which are read out for the first time within one video frame period, are stored in the frame memories 511-L1 and 511-S1. In addition, the image signals of the long time exposure and the short time exposure, which are read out for the second time within one video frame period, are stored in the frame memories 511-L2 and 511-S2.

The image signals of the long time exposure that are stored in the frame memories 511-L1 and 511-L2 are supplied to the long time exposure signal adjusting section 512, and an image signal of one picked up a long time exposure image in one video frame period is calculated. In addition, the image signals of the short time exposure that are stored in the frame memories 511-S1 and 511-S2 are supplied to the short time exposure signal adjusting section 513, and an image signal of one picked up a short time exposure image in one video frame period is calculated. In addition, the image signal calculated by the long time exposure signal adjusting section 512 and the image signal calculated by the short time exposure signal adjusting section 513 are output to the composition processing unit 52 with the timings thereof coinciding with each other, and a process of generating an image having a wide dynamic range is performed.

By continuously repeating a combination of sweeping of the short time exposure and the sweeping of the long time exposure within one video frame period several times, the time difference between the exposure periods of the long time exposure and the short time exposure can be decreased. Accordingly, generation of a false color or an afterimage of a subject can be suppressed further.

For example, an image area in which a subject moves over the periods T1 and T2 within one video frame period, an image signal of the subject can be acquired in the period T1, and an image signal of the background can be acquired in period T2 will be considered. In such a case, according to a general method, long time exposure is performed in the period T1, and short time exposure is performed in the period T2. Accordingly, the image signal of the subject can be acquired by the long time exposure, and the image signal of the background can be acquired by the short time exposure. Therefore, when a demosaicing process is performed as camera signal processing, a false color may be generated. However, by continuously repeating a combination of sweeping of the short time exposure and sweeping of the long time exposure within one video frame period several times, the time difference between the exposure periods of the long time exposure and the short time exposure can be decreased. Accordingly, long time exposure and short time exposure are performed in the period T1, and long time exposure and short time exposure are performed in the periods T2. Then, image signals of the long time exposure and image signals of the short time exposure, for example, are respectively added or averaged by the image signal processing unit 51a. Accordingly, even when the subject moves over the periods T1 and T2, generation of a false color due to the motion can be decreased. In the sixth embodiment, a solid-state imaging device 10 and an image signal adjusting unit 51b of the imaging apparatus 50 are configured to be the same as those of the fifth embodiment.

6. Sixth Embodiment

Next, a sixth embodiment that can further suppress generation of a false color or an afterimage of a subject by repeating a combination of the read-out of a long time exposure signal and the read-out of a short time exposure signal according to the first embodiment several times within one video frame period will be described.

Operation of Sixth Embodiment

FIGS. 18A to 18G are diagrams illustrating the operation of a sixth embodiment. For a solid-state imaging device 10, read-out of a long time exposure image and read-out of a short time exposure image are alternately performed for each line.

Figure 18:
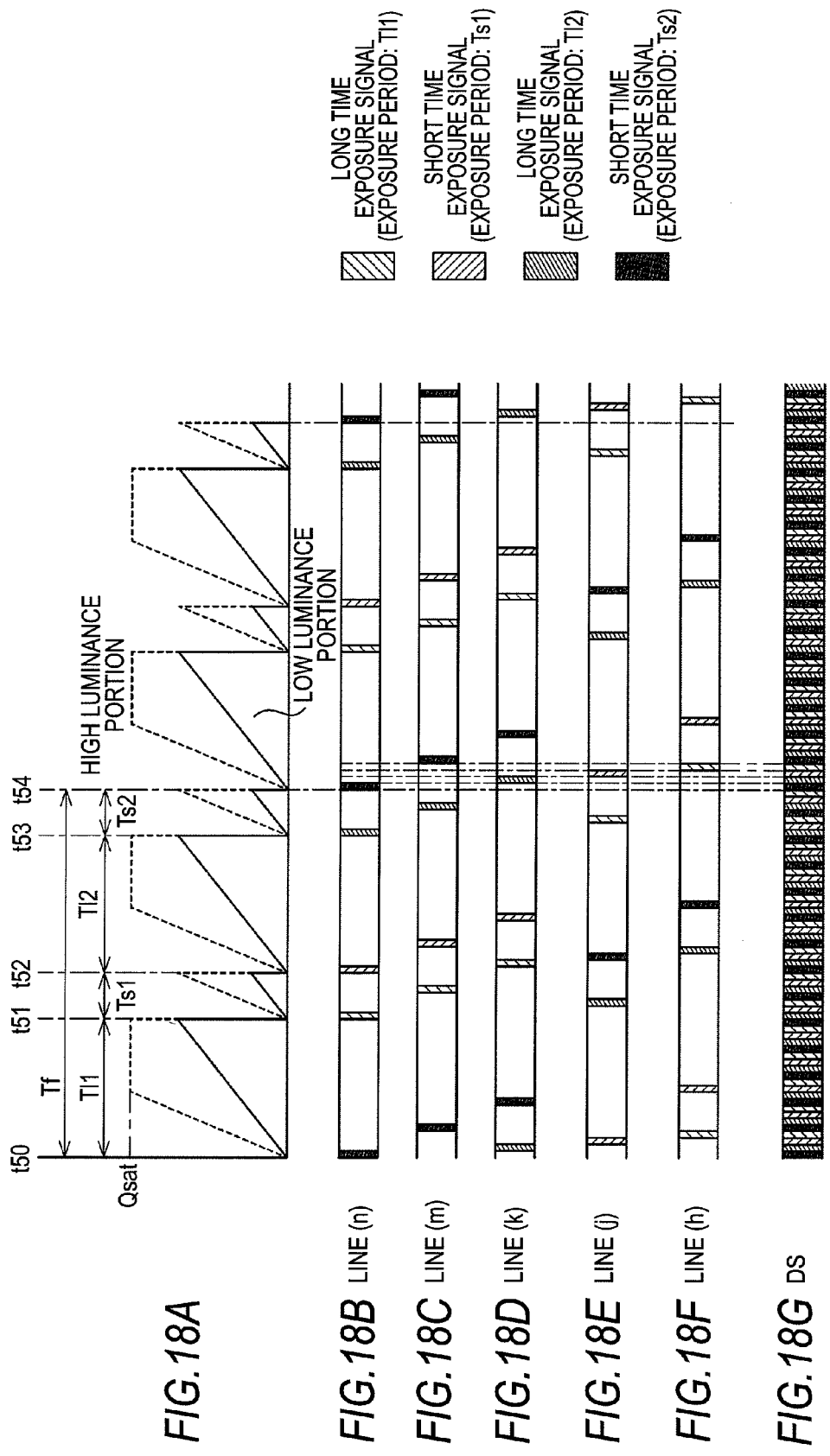
FIGS. 18A to 18G are diagrams illustrating the operation of a sixth embodiment.

FIG. 18A shows a temporal change in the signal electric charges accumulated in a photo diode of a pixel of line (n). In addition, FIG. 18B shows the operation of a pixel of line (n), and FIG. 18C shows the operation of a pixel of line (m). FIG. 18D shows the operation of a pixel of line (k). In addition, FIG. 18E shows the operation of a pixel of line (j), and FIG. 18F shows the operation of a pixel of line (h). FIG. 18G shows an image signal DS. In FIG. 18A, a broken line represents a high luminance portion, and a solid line represents a low luminance portion. In addition, Qsat represents the saturation level of the pixel.

For the pixel of the line (n), as shown in FIGS. 18A and 18B, the read-out of the signal electric charges accumulated by the long time exposure is performed at time point t51, that is, a time point when the long time exposure period T11 elapses from time point t50. In addition, a short time exposure period Ts1 is set, and the read-out of signal electric charges accumulated by the short time exposure is performed at time point t52 that is a time point when the long time exposure period T11 and the short time exposure period Ts1 elapse from the time point t50 when the long time exposure is started. Then, the read-out of the signal electric charges accumulated by the long time exposure is performed at time point t53 that is a time point when the long time exposure period T12 elapses from the time point t52. In addition, a short time exposure period Ts2 is set, and the read-out of signal electric charges accumulated by the short time exposure is performed at time point t54 that is a time point when the long time exposure period T12 and the short time exposure period Ts2 elapse from the time point t52 when the long time exposure is started. Here, a period from the time point t50 to the time point t54 is one video frame period Tf. In addition, a period from the time point t50 to the time point t52 and a period from the time point t52 to the time point t54 are the same.

After the signal electric charges accumulated during the short time exposure period Ts2 are read out from the pixel of the line (n), the pixel of a line from which the signal electric charges accumulated during the long time exposure period T12 are to be read out is set to the pixel of the line (k). In addition, after the signal electric charges of the long time exposure are read out from the pixel of the line (k), the pixel of a line from which the signal electric charges accumulated during the short time exposure period Ts1 are to be read out is set to the pixel of the line (j). In addition, after the signal electric charges of the short time exposure are read out from the pixel of the line (j), the pixel of a line from which the signal electric charges accumulated during the long time exposure period T11 are to be read out is set to the pixel of the line (h). By performing the read-out of the signal electric charges as described above, the signal electric charges are read out from each pixel of the lines (n), (k), (j), and (h) at timings represented in FIGS. 18B to 18F.

As described above, after the signal electric charges accumulated during the short time exposure period Ts2 are read out from the pixel of the line (n), the selection of the lines (k), (j), and (h) shifted from the position of the scanning order is included before the read-out of the signal electric charges accumulated during the short time exposure period Ts2 is performed for the pixel of the line (m). In other words, by including the selection of the lines shifted from the position of the scanning order, the signal electric charges accumulated during the long time exposure periods T11 and T12 and the signal electric charges accumulated during the short time exposure period Ts1 can be read out. Accordingly, the image signal DS output from the solid-state imaging device 10, as shown in FIG. 18G, is a signal in which an image signal corresponding to one line, for which the first and second long time exposures have been completed, and an image signal corresponding to one line, for which the first and second short time exposures have been completed, are alternately output. In addition, the image signal of the long time exposure and the image signal of the short time exposure are respectively output in the unit of one line in the order of the vertical scanning direction.

Figure 19:
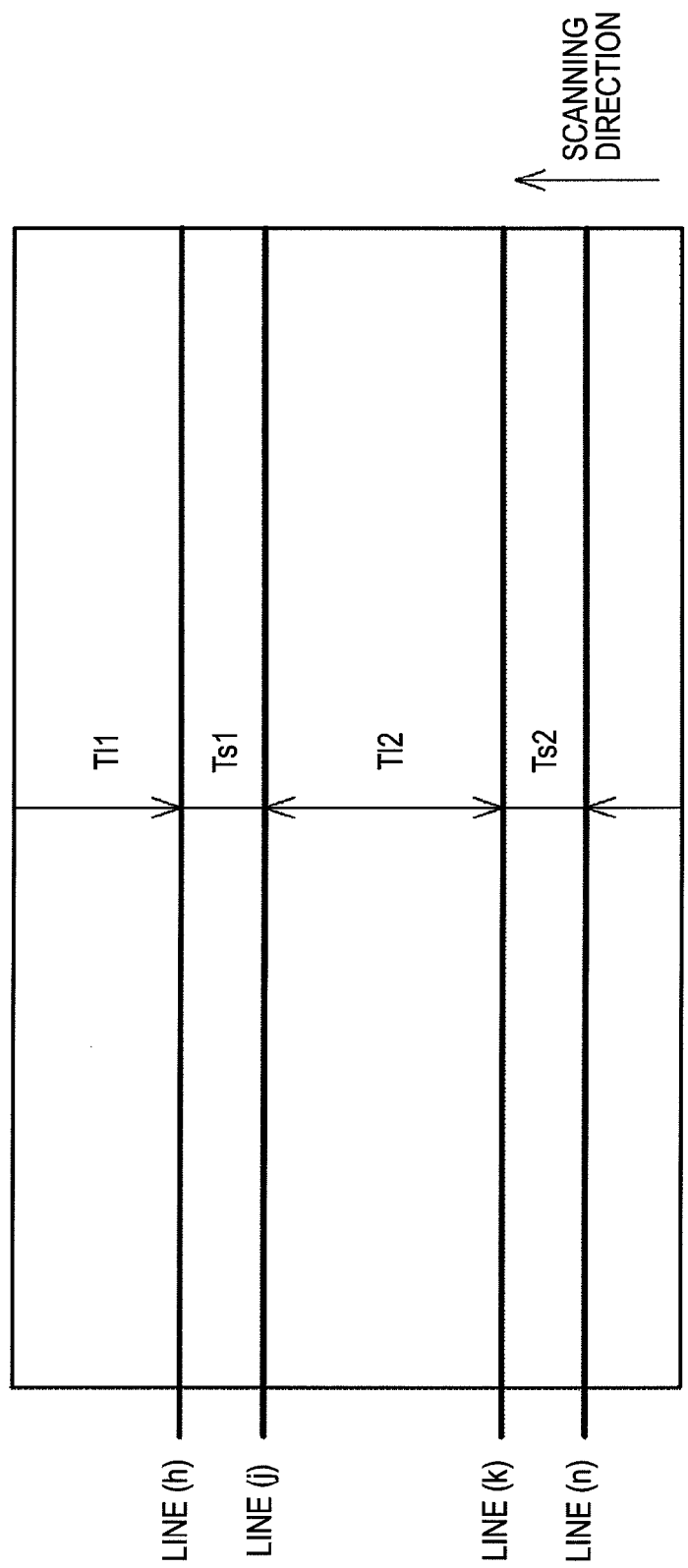
FIG. 19 is a diagram showing line positions at time point t54.

FIG. 19 shows the line positions at time point t54. At the time point t54, the pixel of the line (n) is selected, and the signal electric charges of the short time exposure are read out. In addition, at the time point t54, when the positions shifted in accordance with the exposure period are set as the lines (m), (k), (j), and (h), the signal electric charges of the second long time exposure, the signal electric charges of the first short time exposure, and the signal electric charges of the first long time exposure can be read out after the read-out of the signal electric charges of the second short time exposure is performed from the line (n). Here, the operation of reading out the signal electric charges also serves as a reset operation at the start of the next exposure.

By performing the read-out of the signal electric charges as described above, the time difference between the short time exposure image and the long time exposure image can be decreased, compared to that of the first embodiment. In addition, according to the sixth embodiment, the completion of the long time exposure in one video frame period is at the time point t53 so as to be delayed from that of the first embodiment. Accordingly, in the sixth, embodiment, an average of images for a time longer than that in the first embodiment can be acquired. Therefore, according to the sixth embodiment, generation of a false color can be further suppressed, compared to the first embodiment. In addition, in the sixth embodiment, all the period other than the short time exposure period is allotted to the long time exposure period, and thereby deterioration of the sensitivity of a dark portion can be further prevented, compared to the fifth embodiment.

7. Seventh Embodiment

In the above-described fifth and sixth embodiments, the time difference between the long time exposure image and the short time exposure image is decreased by repeating a combination of sweeping of the short time exposure and sweeping of the long time exposure to be continuous within one video frame period several times. However, the method of decreasing the time difference is not limited to that used in the fifth and sixth embodiments. In other words, by shortening the total exposure period including the long time exposure and the short time exposure, the time difference between the long time exposure image and the short time exposure image can be further decreased. By decreasing the time difference, the motion blurring can be suppressed.

According to the seventh embodiment, a combination of sweeping of the short time exposure and sweeping of the long time exposure is repeated several times to be continuous within one video frame period without arranging a void period between the long time exposure and the short time exposure. In addition, by setting the line from which the accumulated signal electric charges are ejected in the line selection performed in the vertical scanning direction, that is, by arranging a shutter operation, the total exposure period including the long time exposure and the short time exposure is shortened. In addition, in the seventh embodiment, a solid-state imaging device 10 and an image signal adjusting unit 51b of an imaging apparatus 50 are configured to be the same as those of the fifth embodiment.

Operation of Seventh Embodiment

FIGS. 20A to 20H are diagrams illustrating the operation of the seventh embodiment. For a solid-state imaging device 10, read-out of a long time exposure image and read-out of a short time exposure image are alternately performed for each line.

Figure 20:
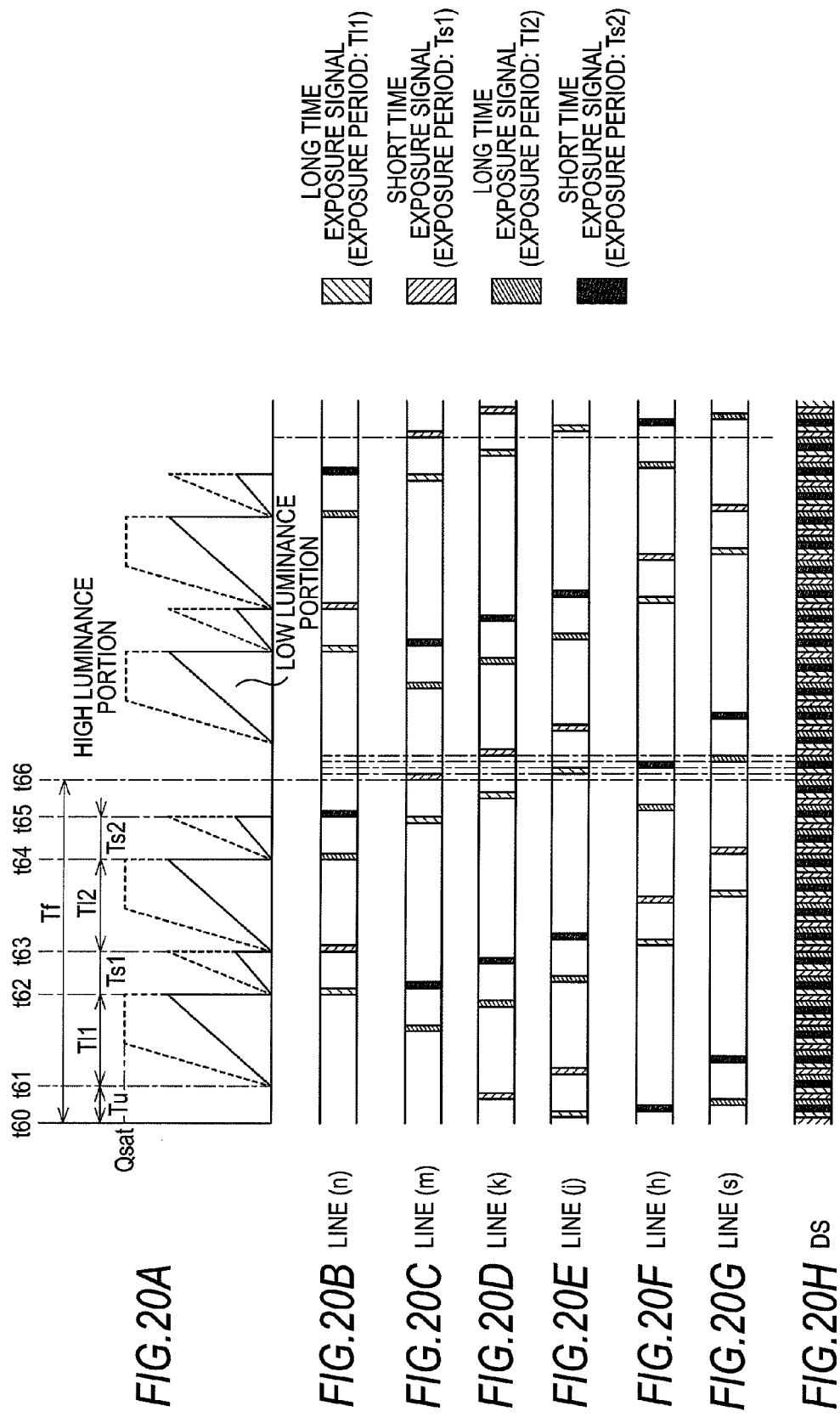
FIGS. 20A to 20H are diagrams illustrating the operation of a seventh embodiment.

FIG. 20A shows a temporal change in the signal electric charges accumulated in a photo diode of a pixel of line (n). In addition, FIG. 20B shows the operation of a pixel of line (n), and FIG. 20C shows the operation of a pixel of line (m). FIG. 20D shows the operation of a pixel of line (k). In addition, FIGS. 20E, 20F, and 20G show the operations of a pixel of lines (j), (h), and (g). FIG. 20H shows an image signal DS. In FIG. 20A, a broken line represents a high luminance portion, and a solid line represents a low luminance portion. In addition, Qsat represents the saturation level of the pixel.

For the pixel of the line (n), as shown in FIG. 20A, a shutter operation is performed at time point t61 when a period Tu elapses from time point t60, and the read-out of the signal electric charges accumulated by the long time exposure is performed at time point t62, that is, a time point when the long time exposure period T11 elapses from the time point t61. In addition, a short time exposure period Ts1 is set after the time point t62, and the read-out of signal electric charges accumulated by the short time exposure is performed at time point t63 that is a time point when the short time exposure period Ts1 elapses from the time point t62. In addition, the long time exposure period T12 is set after the time point t63, and the read-out of the signal electric charges accumulated by the second long time exposure is performed at time point t64 that is a time point when the long time exposure period T12 elapses from the time point t63. In addition, a short time exposure period Ts2 is set after the time point t64, and the read-out of signal electric charges accumulated by the second short time exposure is performed at time point t65 that is a time point when the short time exposure period Ts2 elapses from the time point t64.

After the signal electric charges accumulated during the short time exposure period Ts1 are read out from the pixel of the line (m), the pixel of a line from which the signal electric charges accumulated during the long time exposure period T11 are to be read out is set to the pixel of the line (j). In addition, after the signal electric charges of the long time exposure are read out from the pixel of the line (j), the pixel of a line from which the signal electric charges accumulated during the short time exposure period Ts2 are to be read out is set to the pixel of the line (h). In addition, after the signal electric charges of the short time exposure are read out from the pixel of the line (h), the pixel of a line from which the signal electric charges accumulated during the long time exposure period T12 are to be read out is set to the pixel of the line (g). By performing the read-out of the signal electric charges as described above, the signal electric charges are read out from each pixel of the lines (k), (j), (h) and (g) at timings represented in FIGS. 20C to 20G.

As described above, after the signal electric charges accumulated during the short time exposure period Ts1 are read out from the pixel of the line (m), the selection of the lines (j), (h), and (g) shifted from the position of the scanning order is included before the read-out of the signal electric charges accumulated during the short time exposure period Ts1 is performed for the pixel of the line (k). In other words, by including the selection of the lines shifted from the position of the scanning order, the signal electric charges accumulated during the long time exposure periods T11, the signal electric charges accumulated during the short time exposure period Ts2, and the signal electric charges accumulated during the long time exposure periods T12 can be read out. Accordingly, the image signal DS output from the solid-state imaging device 10, as shown in FIG. 20H, is a signal in which an image signal corresponding to one line, for which the first and second long time exposures have been completed, and an image signal corresponding to one line, for which the first and second short time exposures have been completed, are alternately output. In addition, the image signal of the long time exposure and the image signal of the short time exposure are respectively output in the unit of one line in the order of the vertical scanning direction.

Figure 21:
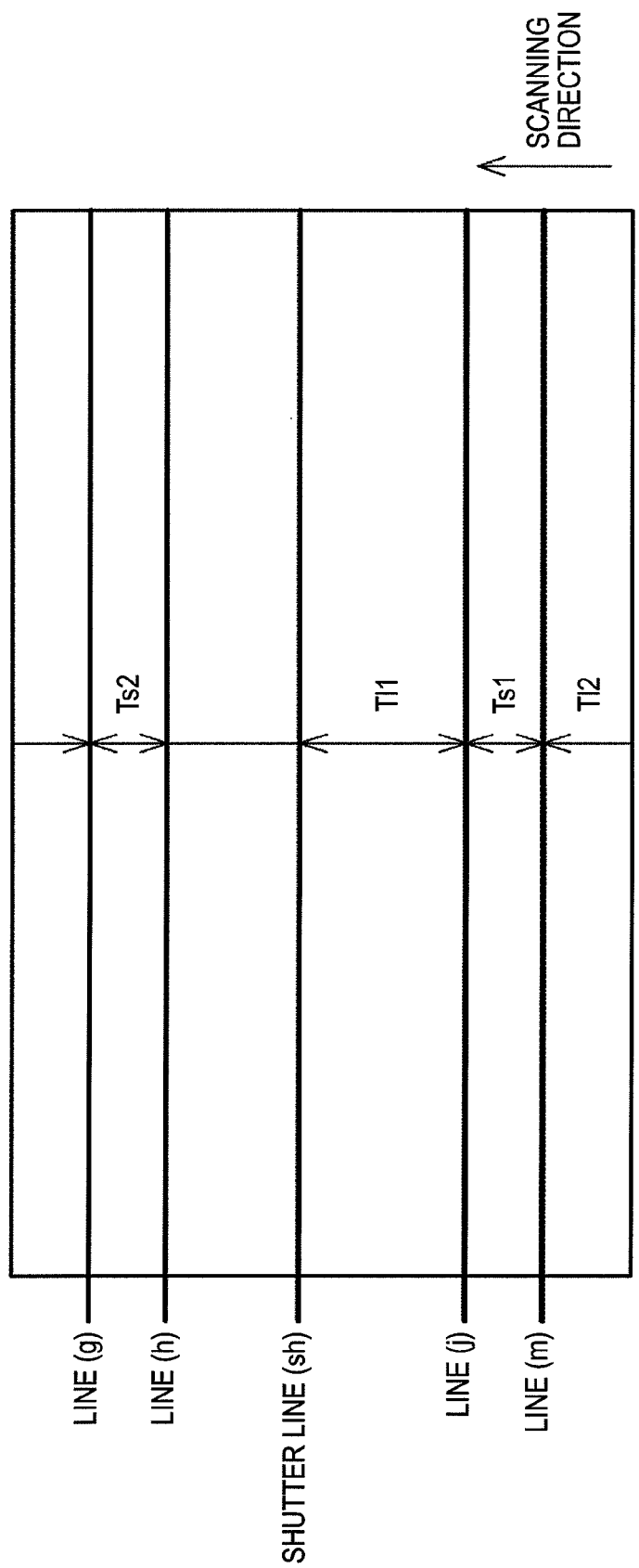
FIG. 21 is a diagram showing line positions at time point t66.
Figure 27A:
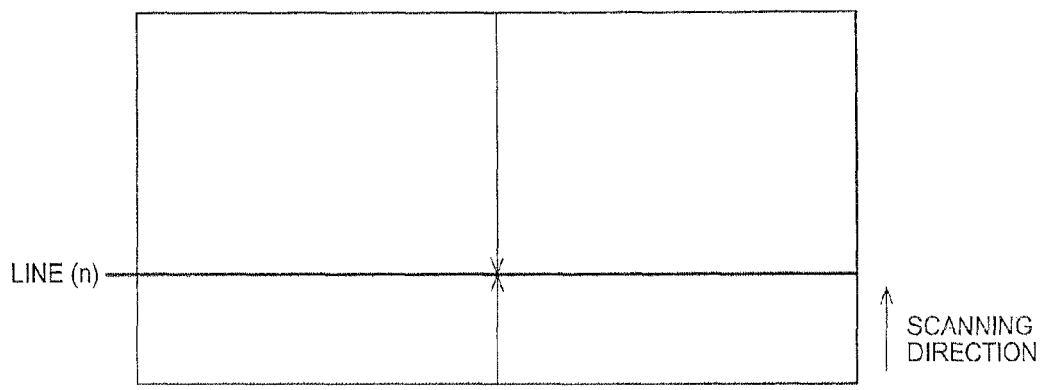
FIGS. 27A and 27B are diagrams showing a line from which signal electric charges are read out in an operation of related art.
Figure 27B:
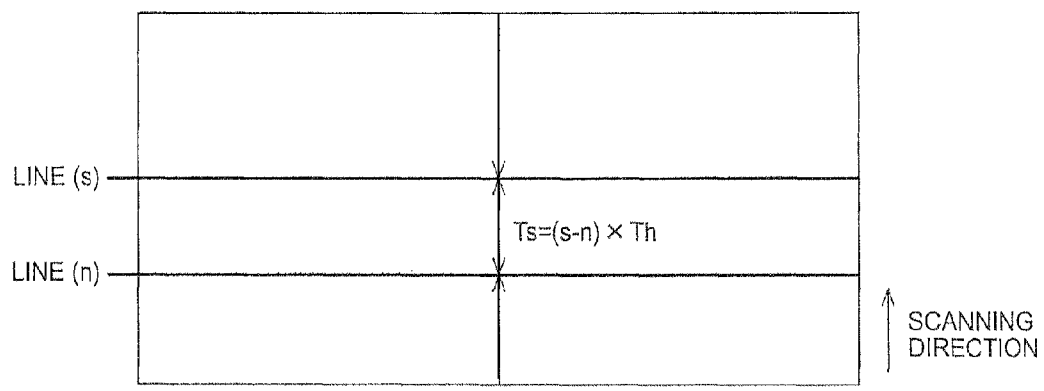

FIG. 21 shows the line positions at time point t66. At the time point t66, the pixel of the line (m) is selected, and the signal electric charges accumulated during the short time exposure period Ts1 are read out. FIG. 21 shows the pixel of the line (j) from which the signal electric charges accumulated during the long time exposure period T11 are read out after the read-out of the signal electric charges from the pixel of the line (m). In addition, FIG. 21 shows the pixel of the line (h) from which the signal electric charges accumulated during the short time exposure period Ts2 are read out after the read-out of the signal electric charges from the pixel of the line (j). Furthermore, FIG. 21 shows the pixel of the line (g) from which the signal electric charges accumulated during the long time exposure period T12 are read out after the read-out of the signal electric charges from the pixel of the line (h).

When being set in accordance with the short time exposure periods Ts1 and Ts2 and the long time exposure periods T11 and T12, the pixels of the lines (j), (h), and (g), as represented in FIG. 21H, can sequentially output the image signals of the short time exposure periods Ts1 and Ts2 and the image signals of the long time exposure periods T11 and T12 for each line. In addition, by shortening the long time exposure period and/or the short time period at a time when the signal electric charges are read out without arranging a void period between the long time exposure and the short time exposure, the time difference between the short time exposure image and the long time exposure image can be further decreased. Accordingly, the level of generation of a false color can be further suppressed.

By arranging a shutter operation, the sensitivity of a dark portion is decreased in a case where the long time exposure period is shortened. However, such relationship is the same as relationship between a shutter operation of a general camera and an exposure period. Thus, it is preferable that an appropriate setting is acquired in accordance with trade-off between avoidance of the motion blurring and the sensitivity. In the seventh embodiment, an example in which the long time exposure is performed first, and the shutter operation is arranged at the time of start of the long time exposure has been shown. However, it may be configured that the short time exposure is performed first, and the shutter operation is performed at the time of start of the short time exposure.

8. Eighth Embodiment

Next, an eighth embodiment in which, in a case where only a part of the signal electric charges is ejected by applying an intermediate voltage to the unit pixel in resetting the signal electric charges for accumulating signal electric charges of the short time exposure, the time difference between the short time exposure image and the long time exposure image is decreased by arranging the exposure period to be shorter than one video frame period will be described. In addition, in the eighth embodiment, a solid-state imaging device 10 and an image signal adjusting unit 51b of an imaging apparatus 50 are configured to be the same as those of the fifth embodiment.

Operation of Eighth Embodiment

By allowing the selection of lines shifted from the position of the scanning order to be included in the line selection performed in the scanning direction, similarly to the third embodiment, read-out of pixels corresponding to one line, for which the long time exposure has been completed, and read-out of pixels corresponding to one line, for which the short time exposure has been completed are alternately performed in reading out the signal electric charges.

FIGS. 22A to 22F are diagrams illustrating the operation of the eighth embodiment. FIG. 22A shows a temporal change in the signal electric charges accumulated in a photo diode of a pixel of line (n) for a high luminance portion and a low luminance portion. In addition, FIG. 22B shows the operation of a pixel of line (n), and FIG. 22C shows the operation of a pixel of line (n+1). FIG. 22D shows the operation of a pixel of line (s). In addition, FIG. 22E shows the operations of a pixel of line (s+1), and FIG. 22F shows an image signal DS. In FIG. 22A, a broken line represents the high luminance portion, and a solid line represents the low luminance portion. In addition, Qsat represents the saturation level of the pixel, and Qmid represents a difference between the saturation level Qsat of the pixel and the intermediate voltage.

For example, for the pixel of the line (n), as shown in FIGS. 22A and 22B, a shutter operation is performed time point t71 that is a time point when a period Tu0 elapses from time point t70, and the read-out of signal electric charges accumulated by the long time exposure is performed at time point t72 that is a time point when a long time exposure period T11 elapses from the time point t71. In addition, a short time exposure period Ts and a time difference Tr are set. The read-out of the signal electric charges accumulated by the short time exposure is performed at time point t73 that is earlier by the time difference Tr than the read-out of the signal electric charges accumulated by the long time exposure. Accordingly, reset of the signal electric charges for accumulation of electric charges of the short time exposure is performed at time point t72 (a time point when the period Tu1 elapses from the time point t71) that is earlier by the short time exposure period Ts than the time point t73. As described above, the read-out of a part of the signal electric charges is performed in the order of the setting of the plurality of exposure periods, and then read-out of all the signal electric charges is performed.

After the signal electric charges of the long time exposure are read out from the pixel of the line (n), the pixel of a line from which the signal electric charges of the short time exposure are to be read out is set to the pixel of the line (s). In addition, after the read-out of the signal electric charges of the short time exposure is performed for the line (s), read-out of signal electric charges of the long time exposure is performed for the pixel of the line (n+1). Then, after the read-out of the signal electric charges of the long time exposure is performed for the line (n+1), read-out of signal electric charges of the short time exposure is performed for the pixel of the line (s+1). By performing the read-out of signal electric charges as described above, the read-out is performed for each pixel of the lines (n), (n+1), (s), and (s+1) at timings represented in FIGS. 22B to 22E.

Accordingly, the image signal DS output from the solid-state imaging device 10, as shown in FIG. 22F, is a signal in which an image corresponding to one line, for which the long time exposure has been completed, and an image corresponding to one line, for which the short time exposure has been completed are alternately read out. In addition, the image signal of the long time exposure and the image signal of the short time exposure are respectively output in the unit of one line in the order of the vertical scanning direction.

When the read-out of the signal electric charges is performed as described above, a time difference between the short time exposure image and the long time exposure image can be further decreased.

FIG. 23 shows the line positions at time point t74. At the time point t74, the pixel of the line (n) is selected, and the signal electric charges accumulated by the long time exposure are read out. In addition, in FIG. 23, rows corresponding to the pixel of the line (s) from which the signal electric charges accumulated by the short time exposure are read out after the read-out of the signal electric charges from the pixel of the line (n) and a timing at which reset is performed are denoted by shutter lines (sh0) and (sh1).

By arranging the exposure period to be shorter than one video frame period as described above, the time difference between a short time exposure image and a long time exposure image can be further shortened. Accordingly, generation of a false color or an after image can be decreased, compared to a case where the exposure period is one video frame period.

9. Ninth Embodiment

In addition, when the operation of reading out the signal electric charges represented in the eighth embodiment is continuously performed several times within one frame period, the time difference between the short time exposure image and the long time exposure image can be further decreased, compared to the eighth embodiment. In the ninth embodiment, a case where the operation of reading out the signal electric charges represented in the eighth embodiment is continuously performed twice in one frame period is represented. In addition, in the ninth embodiment, a solid-state imaging device 10 and an image signal adjusting unit 51b of an imaging apparatus 50 are configured to be the same as those of the fifth embodiment.

Operation of Ninth Embodiment

By allowing the selection of lines shifted from the position of the scanning order to be included in the line selection performed in the scanning direction, similarly to the eighth embodiment, read-out of pixels corresponding to one line, for which the long time exposure has been completed, and read-out of pixels corresponding to one line, for which the short time exposure has been completed are alternately performed in reading out the signal electric charges.

FIGS. 24A to 24G are diagrams illustrating the operation of the ninth embodiment. FIG. 24A shows a temporal change in the signal electric charges accumulated in a photo diode of a pixel of line (n) for a high luminance portion and a low luminance portion. In addition, FIG. 24B shows the operation of a pixel of line (n), and FIG. 24C shows the operation of a pixel of line (m). FIG. 24D shows the operation of a pixel of line (k). In addition, FIGS. 24E and 24F show the operations of pixels of lines (j) and (h), and FIG. 24G shows an image signal DS. In FIG. 24A, a broken line represents the high luminance portion, and a solid line represents the low luminance portion. In addition, Qsat represents the saturation level of the pixel, and Qmid represents a difference between the saturation level Qsat of the pixel and the intermediate voltage.

For example, for the pixel of the line (n), as shown in FIGS. 24A and 24B, a shutter operation is performed time point t81 that is a time point when a period Tu0 elapses from time point t80, and the read-out of signal electric charges accumulated by the long time exposure is performed at time point t84 that is a time point when a long time exposure period T11 elapses from the time point t81. In addition, a short time exposure period Ts1 and a time difference Tr are set. The read-out of the signal electric charges accumulated by the short time exposure is performed at time point t83 that is earlier by the time difference Tr than the read-out of the signal electric charges accumulated by the long time exposure. Accordingly, reset of the signal electric charges for accumulation of electric charges of the short time exposure is performed at time point t82 (a time point when the period Tu1 elapses from the time point t81) that is earlier by the short time exposure period Ts1 than the time point t83.

Next, the read-out of the signal electric charges accumulated by the second long time exposure is performed at time point t87 that is a time point when the long time exposure period T12 elapses from the time point t84. In addition, a short time exposure period Ts2 is set, and the read-out of the signal electric charges accumulated by the second short time exposure is performed at time point t86 that is earlier by the time difference Tr than the read-out of the signal electric charges accumulated by the long time exposure. Accordingly, reset of the signal electric charges for accumulation of electric charges of the short time exposure is performed at time point t85 (a time point when the period Tu1 elapses from the time point t84) that is earlier by the short time exposure period Ts2 than the time point t86. As described above, the read-out of a part of the signal electric charges is performed in the order of the setting of the plurality of exposure periods, and then read-out of all the signal electric charges is performed.

After the signal electric charges accumulated during the short time exposure period Ts1 are read out from the pixel of the line (m), the pixel of a line from which the signal electric charges accumulated during the long time exposure period T12 are to be read out is set to the pixel of the line (j). In addition, after the signal electric charges of the long time exposure are read out from the pixel of the line (j), the pixel of a line from which the signal electric charges accumulated during the short time exposure period Ts2 are to be read out is set to the pixel of the line (h). Furthermore, after the signal electric charges of the short time exposure period Ts2 are read out, the pixel of a line from which the signal electric charges accumulated during the long time exposure period T11 are to be read out is set to the pixel of the line (m). By performing the read-out of the signal electric charges as described above, the signal electric charges are read out from each pixel of the lines (m), (j), and (h) at timings represented in FIGS. 24C to 24F.

As described above, after the signal electric charges accumulated during the short time exposure period Ts1 are read out from the pixel of the line (m), the selection of the lines (j), (h), and (m) shifted from the position of the scanning order is included before the read-out of the signal electric charges accumulated during the short time exposure period Ts1 is performed for the pixel of the line (k). In other words, by including the selection of the lines shifted from the position of the scanning order, the signal electric charges accumulated during the long time exposure period T11, the signal electric charges accumulated during the short time exposure period Ts2, and the signal electric charges accumulated during the long time exposure period T12 can be read out. Accordingly, the image signal DS output from the solid-state imaging device 10, as shown in FIG. 24G, is a signal in which an image signal corresponding to one line, for which the first and second long time exposures have been completed, and an image signal corresponding to one line, for which the first and second short time exposures have been completed, are alternately output. In addition, the image signal of the long time exposure and the image signal of the short time exposure are respectively output in the unit of one line in the order of the vertical scanning direction.

FIG. 25 shows the line positions at time point t88. At the time point t88, the pixel of the line (m) is selected, and the signal electric charges accumulated during the short time exposure period Ts1 are read out. In addition, in FIG. 25, rows corresponding to the pixels of the lines (k) and (j) from which the signal electric charges are read out after the read-out of the signal electric charges from the pixel of the line (m) and a timing at which reset is performed are denoted by shutter lines (sh0) and (sh1).

By repeating a combination of sweeping of the short time exposure and sweeping of the long time exposure several times in a continuous manner, the time difference between the short time exposure image and the long time exposure image can be further decreased. Accordingly, generation of a false color or an afterimage can be further suppressed, compared to the eighth embodiment.

10. Tenth Embodiment

The imaging operation is not limited to be performed by using any one of the above-described embodiments. Thus, a plurality of the embodiments may be performed in a combinational manner. For example, the brightness of the subject is detected, and the operation of the sixth embodiment is performed in a case where the subject is dark. On the other hand, in a case where the subject is bright, similarly to the seventh embodiment, a period Tu0 may be arranged before the first long time exposure so as to adjust the exposure period. In addition, the lengths of the period Tu0, the long time exposure periods T11 and T12, and the short time exposure periods Ts1 and Ts2 may be adjusted in accordance with the brightness of the subject. Here, when the period Tu0 is lengthened in accordance with the brightness of the subject, the time difference between the long time exposure image and the short time exposure image can be decreased. Therefore, the time difference between the long time exposure image and the short time exposure image is decreased when the subject is bright, and thereby the motion blurring can be decreased.

In addition, the long time exposure periods T11 and T12 may be shortened in accordance with the brightness of the subject. The long time exposure period is a period that is arranged for generating a captured image having appropriate brightness even in a case where the subject is dark. Accordingly, when the subject is bright, a picked up image in which the subject has appropriate brightness can be acquired even in a case where the long time exposure period is shortened. Furthermore, when the subject is very bright, the short time exposure periods Ts1 and Ts2 may be shortened. The short time exposure period is a period that is arranged for generating a picked up image in which the subject has appropriate brightness even in a case where the subject is bright. Accordingly, in a case where the subject is very bright, when the short time exposure period is shortened, a picked up image in which the subject is has appropriate brightness can be acquired. In addition, by shortening the long time exposure periods and/or the short time exposure periods, the time difference between the long time exposure image and the short time exposure image is decreased, and thereby the motion blurring can be decreased.

In addition, for detection of the brightness of the subject, for example, the luminance level of the picked up image may be detected by processing an image signal output from the solid-state imaging device 10. Alternatively, a sensor that detects the brightness of the subject may be disposed in the imaging apparatus, and the imaging operation may be controlled in accordance with a detection signal transmitted from the sensor.

As described above, in the line selection for the vertical scanning direction, between the lines selected in the scanning order, a line having an exposure period different from that of the selected line is selected, and image signals of an image having different exposure periods are sequentially output in the unit of one line. Accordingly, the time difference between the long time exposure image and the short time exposure image can be decreased. Therefore, an image signal, in which generation of a false color or an afterimage is suppressed, having a wide dynamic range can be easily generated by using a simple configuration. In addition, by continuously repeating a combination of sweeping of the short time exposure and sweeping of the long time exposure several times within one video frame period or by shortening the long time exposure periods and/or the short time exposure periods, the time difference between the long time exposure and the short time exposure can be further decreased. Therefore, generation of a false color or an afterimage can be further suppressed.

The present invention should not be construed as being limited to the above-described embodiments. For example, the long time exposure and the short time exposure may be arranged to be performed three times or more in one video frame period. The embodiments of the present invention disclose the invention in an exemplary form, and it is apparent that those skilled in the art can modify or change the embodiments within the scope not departing from the basic concept of the present invention. In other words, in order to determine the basic concept of the present invention, the claims should be referred to.

According to a solid-state imaging device and a driving method of an embodiment of the present invention, in the pixel array unit in which unit pixels each including a photoelectric conversion device converting an optical signal into signal electric charges are two-dimensionally disposed in a matrix shape, the unit pixels, which read out the signal electric charges, are selected for each line, and pixel signals corresponding to the signal electric charges read out from each unit pixel are generated by the signal processing units that are separately disposed for each column of the pixel array unit. In addition, the pixel signals generated by the signal processing units are output as an image signal in the unit of one line. In addition, in selection of a line for a vertical scanning direction, a line having an exposure period different from an exposure period of a selected line is selected between lines selected in the scanning order, and an image signal of an image having the different exposure period is sequentially output in the unit of one line from the horizontal scanning unit.

Accordingly, for example, when a long time exposure period and a short time exposure period are arranged, image read-out of other exposure period can be performed before image read-out of the one exposure period is completed. Therefore, a time difference between the long time exposure image and the short time exposure image can be decreased. Therefore, an image signal, in which generation of a false color or an afterimage is suppressed, having a wide dynamic range can be easily generated by using a simple configuration. As a result, an embodiment of the present invention is very appropriate to an imaging apparatus, for example, for the use of monitoring and the like that may require a wide dynamic range.

The present application contains subject matter related to that disclosed in Japanese Priority Patent Applications JP 2009-110750 and JP 2010-012927 filed in the Japan Patent Office on Apr. 30, 2009 and Jan. 25, 2010, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit in which unit pixels each including a photoelectric conversion device converting an optical signal into signal electric charges are two-dimensionally disposed in a matrix shape;
   a vertical scanning unit that selects the unit pixels, which read out the signal electric charges, for each line;
   signal processing units that are separately disposed for each column of the pixel array unit and generate pixel signals corresponding to the signal electric charges read out from the unit pixel;
   a horizontal scanning unit that reads out the pixel signal by sequentially selecting the signal processing unit and outputs image signals in the unit of one line; and
   a scanning control unit that performs operations of the vertical scanning unit and the horizontal scanning unit,
   wherein the scanning control unit, in selection of a line for a vertical scanning direction, selects a line having an exposure period different from an exposure period of a selected line between lines selected in the scanning order and sequentially outputs an image signal of an image having the different exposure period in the unit of one line from the horizontal scanning unit,
   wherein the scanning control unit selects a line located in a position far away from a position of the scanning order in accordance with the different exposure period as the selection of the line having the different exposure period, and
   wherein the scanning control unit adjusts the lengths of the exposure periods in accordance with brightness of a subject.

2. The solid-state imaging device according to claim 1, wherein the scanning control unit performs a read-out operation for the signal electric charges of the selected line as a reset operation for starting exposure of an exposure period different from the exposure period of the read-out signal electric charges.

3. The solid-state imaging device according to claim 2, wherein the scanning control unit arranges a plurality of exposure periods within a frame period and sets the plurality of exposure periods to different lengths.

4. The solid-state imaging device according to claim 3, wherein the scanning control unit continuously repeats a combination of the plurality of exposure periods within the frame period.

5. The solid-state imaging device according to claim 3, wherein the scanning control unit can adjust the lengths of the plurality of exposure periods.

6. The solid-state imaging device according to claim 5, wherein the scanning control unit adjusts the lengths of the exposure periods by setting a line for which ejection of accumulated signal electric charges is performed in the selection of the line for the vertical scanning direction.

7. The solid-state imaging device according to claim 3, wherein the plurality of exposure periods are set in the order of the length of the exposure period.

8. The solid-state imaging device according to claim 1, wherein the scanning control unit adjusts the exposure period having a long exposure period out of the plurality of exposure periods.

9. The solid-state imaging device according to claim 1, wherein the scanning control unit sets at least one or more operations of resetting a part of the signal electric charges by applying an intermediate voltage to the unit pixel in the setting of the exposure period.

10. The solid-state imaging device according to claim 9, wherein the scanning control unit combinedly performs a first read-out of the signal electric charges that reads the signal electric charges accumulated after the reset of the signal electric charges and a second read-out of the signal electric charges that reads out the signal electric charges accumulated after the reset of the part of the signal electric charges by applying the intermediate voltage, and performs the first read-out of the signal electric charges after performing the second read-out of the signal electric charges.

11. A method of driving a solid-state imaging device including
a pixel array unit in which unit pixels each including a photoelectric conversion device converting an optical signal into signal electric charges are two-dimensionally disposed in a matrix shape,
a vertical scanning unit that selects the unit pixels, which read out the signal electric charges, for each line,
signal processing units that are separately disposed for each column of the pixel array unit and generate pixel signals corresponding to the signal electric charges read out from the unit pixel,
a horizontal scanning unit that reads out the pixel signal by sequentially selecting the signal processing unit and outputs image signals in the unit of one line, and
a scanning control unit that performs operations of the vertical scanning unit and the horizontal scanning unit,
the method comprising the step of:
allowing the scanning control unit to select a line having an exposure period different from an exposure period of a selected line between lines selected in the scanning order, in selection of the line in a vertical scanning direction and sequentially output an image signal of an image having the different exposure period in the unit of one line from the horizontal scanning unit by using the scanning control unit, and
wherein the scanning control unit selects a line located in a position far away from a position of the scanning order in accordance with the different exposure period as the selection of the line having the different exposure period, and wherein the scanning control unit adjusts the lengths of the exposure periods in accordance with brightness of a subject.

12. An imaging apparatus comprising:
a pixel array unit in which unit pixels each including a photoelectric conversion device converting an optical signal into signal electric charges are two-dimensionally disposed in a matrix shape;
a vertical scanning unit that selects the unit pixels, which read out the signal electric charges, for each line;
signal processing units that are separately disposed for each column of the pixel array unit and generate pixel signals corresponding to the signal electric charges read out from the unit pixel;
a horizontal scanning unit that reads out the pixel signal by sequentially selecting the signal processing unit and outputs image signals in the unit of one line;
a scanning control unit that performs operations of the vertical scanning unit and the horizontal scanning unit;
an image signal adjusting unit that adjusts timings of the image signals output from the horizontal scanning unit; and
a signal composing unit that extends a dynamic range by composing a plurality of the image signals output from the image signal adjusting unit,
wherein the scanning control unit, in selection of a line for a vertical scanning direction, selects a line having an exposure period different from an exposure period of a selected line between lines selected in the scanning order and sequentially outputs an image signal of an image having the different exposure period in the unit of one line from the horizontal scanning unit, and
wherein the image signal adjusting unit divides the image signals output from the horizontal scanning unit for each of the exposure periods and outputs the image signals for each of the exposure periods with timings thereof coinciding with one another, and
wherein the scanning control unit selects a line located in a position far away from a position of the scanning order in accordance with the different exposure period as the selection of the line having the different exposure period, and
wherein the scanning control unit adjusts the lengths of the exposure periods in accordance with brightness of a subject.

13. The imaging apparatus according to claim 12, wherein the image signal adjusting unit is configured by using a memory, controls writing the image signal into the memory and reading out the written image signal, and outputs the image signals output from the horizontal scanning unit as the image signals for each of the exposure periods with timings thereof coinciding with one another.

14. The imaging apparatus according to claim 12,
wherein the scanning control unit repeatedly sets a plurality of exposure periods to be continuous within a frame period, and
wherein the image signal adjusting unit calculates one image signal out of a plurality of image signals within the frame period for each of the exposure periods and outputs the calculated image signals for each of the exposure periods with timings thereof coinciding with one another.

* * * * *